United States Patent
Sugasaki

(10) Patent No.: US 8,663,896 B2
(45) Date of Patent: Mar. 4, 2014

(54) RESIN COMPOSITION FOR LASER ENGRAVING, RELIEF PRINTING PLATE PRECURSOR FOR LASER ENGRAVING AND PROCESS FOR PRODUCING SAME, AND RELIEF PRINTING PLATE AND PROCESS FOR MAKING SAME

(75) Inventor: Atsushi Sugasaki, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 222 days.

(21) Appl. No.: 13/102,762

(22) Filed: May 6, 2011

(65) Prior Publication Data

US 2011/0293896 A1    Dec. 1, 2011

(30) Foreign Application Priority Data

May 27, 2010    (JP) ................. 2010-121488

(51) Int. Cl.
| | |
|---|---|
| G03F 7/004 | (2006.01) |
| G03F 7/027 | (2006.01) |
| G03F 7/26 | (2006.01) |
| B41N 1/06 | (2006.01) |

(52) U.S. Cl.
USPC ........ 430/270.1; 430/300; 430/306; 101/453; 101/463.1

(58) Field of Classification Search
USPC .................. 430/270.1, 281.1, 300, 306, 910; 101/453, 463.1
See application file for complete search history.

(56) References Cited

U.S. PATENT DOCUMENTS

| | | | | |
|---|---|---|---|---|
| 5,798,202 | A * | 8/1998 | Cushner et al. | 430/306 |
| 2007/0160928 | A1* | 7/2007 | Yamada et al. | 430/270.1 |
| 2008/0258344 | A1* | 10/2008 | Regan et al. | 264/400 |
| 2008/0268371 | A1* | 10/2008 | Taguchi | 430/270.1 |
| 2009/0191479 | A1* | 7/2009 | Sugasaki | 430/281.1 |
| 2010/0075117 | A1* | 3/2010 | Kawashima et al. | 428/195.1 |
| 2011/0156317 | A1* | 6/2011 | Yoshida | 264/400 |

FOREIGN PATENT DOCUMENTS

| | | |
|---|---|---|
| JP | 10-278443 A | 10/1998 |
| JP | 2001-219664 A | 8/2001 |
| JP | 2005-254696 A | 9/2005 |
| JP | 2008/133807 A1 | 11/2008 |
| WO | 03/022594 A1 | 3/2003 |

OTHER PUBLICATIONS

Office Action dated Nov. 26, 2013 in Japanese Application No. 2010-121488.

* cited by examiner

Primary Examiner — Anca Eoff
(74) Attorney, Agent, or Firm — Sughrue Mion, PLLC

(57) ABSTRACT

A resin composition for laser engraving is provided that includes (Component A) a compound having a hydrolyzable silyl group and/or a silanol group, (Component B) a depolymerization catalyst and/or a depolymerization catalyst precursor, and (Component C) a depolymerizable binder polymer. There are also provided a relief printing plate precursor for laser engraving that includes a relief-forming layer containing the resin composition for laser engraving, a relief printing plate precursor for laser engraving having a crosslinked relief-forming layer formed by crosslinking by means of light and/or heat a relief-forming layer that includes the resin composition for laser engraving, a process for producing a relief printing plate precursor for laser engraving that includes a layer formation step of forming a relief-forming layer from the resin composition for laser engraving and a crosslinking step of crosslinking the relief-forming layer by light and/or heat to thus obtain a relief printing plate precursor having a crosslinked relief-forming layer, a process for making a relief printing plate that includes a layer formation step of forming a relief-forming layer from the resin composition for laser engraving, a crosslinking step of crosslinking the relief-forming layer by light and/or heat to thus obtain a relief printing plate precursor having a crosslinked relief-forming layer, and an engraving step of laser-engraving the relief printing plate precursor having a crosslinked relief-forming layer to thus form a relief layer, and a relief printing plate having a relief layer made by the process for making a relief printing plate.

23 Claims, No Drawings

RESIN COMPOSITION FOR LASER ENGRAVING, RELIEF PRINTING PLATE PRECURSOR FOR LASER ENGRAVING AND PROCESS FOR PRODUCING SAME, AND RELIEF PRINTING PLATE AND PROCESS FOR MAKING SAME

TECHNICAL FIELD

The present invention relates to a resin composition for laser engraving, a relief printing plate precursor for laser engraving and a process for producing same, and a relief printing plate and a process for making same.

BACKGROUND ART

A relief printing plate is a letterpress printing plate having a relief layer with asperities, and such a relief layer with asperities is obtained by patterning a relief-forming layer comprising a photosensitive composition containing as a main component, for example, an elastomeric polymer such as a synthetic rubber, a resin such as a thermoplastic resin, or a mixture of a resin and a plasticizer, thus forming asperities. Among such relief printing plates, one having a soft relief layer is sometimes called a flexographic plate.

As a process for making a plate by directly engraving a relief-forming layer by means of a laser, a direct engraving CTP method is known. The direct engraving CTP method is a method in which relief-forming asperities are formed by engraving by means of a laser itself, and has the advantage that, unlike relief formation using an original image film, the relief shape can be freely controlled. Because of this, when an image such as an outline character is formed, it is possible to engrave that region more deeply than other regions, or in the case of a fine halftone dot image it is possible, taking into consideration resistance to printing pressure, to engrave while adding a shoulder.

Furthermore, International Patent Application WO 2008-133807 describes a composition for laser engraving that comprises a depolymerizable binder polymer.

SUMMARY OF THE INVENTION

Problems to be Solved by the Invention

It is an object of the present invention to provide a resin composition for laser engraving that can give a relief printing plate having excellent ink transfer properties and that has excellent rinsing properties for engraving residue generated when laser-engraving a relief printing plate precursor and excellent engraving sensitivity in laser engraving, a relief printing plate precursor employing the resin composition for laser engraving, a process for making a relief printing plate employing same, and a relief printing plate obtained thereby.

Means for Solving the Problems

The above-mentioned object of the present invention has been achieved by means described in <1>, <12> to <14>, <16>, and <17> below. They are described below together with <2> to <11>, <15>, <18>, and <19>, which are preferred embodiments.

<1> A resin composition for laser engraving, comprising (Component A) a compound having a hydrolyzable silyl group and/or a silanol group, (Component B) a depolymerization catalyst and/or a depolymerization catalyst precursor, and (Component C) a depolymerizable binder polymer, <2> the resin composition for laser engraving according to <1> above, wherein Component A is a compound having two or more hydrolyzable silyl groups, <3> the resin composition for laser engraving according to <1> or <2> above, wherein the hydrolyzable silyl group is a hydrolyzable silyl group in which at least one of an alkoxy group and a halogen atom is directly bonded to the Si atom, <4> the resin composition for laser engraving according to any one of <1> to <3> above, wherein Component A is a compound further having in the molecule at least one type of atom or bond selected from the group consisting of a sulfur atom, an ester bond, a urethane bond, and an ether bond, <5> the resin composition for laser engraving according to any one of <1> to <4> above, wherein Component C is a polycyanoacrylate that forms a cyanoacrylate as a main component of a decomposition product when thermally decomposed or a polycarbonate that forms a cyclic carbonate as a main component of a decomposition product when thermally decomposed, <6> the resin composition for laser engraving according to any one of <1> to <5> above, wherein the depolymerization catalyst is a Lewis acid or an organic metal catalyst, <7> the resin composition for laser engraving according to any one of <1> to <6> above, wherein the depolymerization catalyst precursor is an acid generator or a base generator, <8> the resin composition for laser engraving according to any one of <1> to <7> above, wherein the resin composition further comprises (Component D) a catalyst for promoting a hydrolysis reaction and/or condensation reaction of Component A, <9> the resin composition for laser engraving according to any one of <1> to <8> above, wherein the resin composition further comprises (Component E) a polymerizable compound, <10> the resin composition for laser engraving according to any one of <1> to <9> above, wherein the resin composition further comprises (Component F) a polymerization initiator, <11> the resin composition for laser engraving according to any one of <1> to <10> above, wherein the resin composition further comprises (Component G) a photothermal conversion agent that can absorb light having a wavelength of 700 to 1,300 nm, <12> a relief printing plate precursor for laser engraving, comprising a relief-forming layer comprising the resin composition for laser engraving according to any one of <1> to <11> above, <13> a relief printing plate precursor for laser engraving, comprising a crosslinked relief-forming layer formed by crosslinking by means of light and/or heat a relief-forming layer comprising the resin composition for laser engraving according to any one of <1> to <11> above, <14> a process for producing a relief printing plate precursor for laser engraving, comprising a layer formation step of forming a relief-forming layer from the resin composition for laser engraving according to any one of <1> to <11> above and a crosslinking step of crosslinking the relief-forming layer by light and/or heat to thus obtain a relief printing plate precursor having a crosslinked relief-forming layer, <15> the process for producing a relief printing plate precursor for laser engraving according to <14> above, wherein the crosslinking step is a step of crosslinking the resin composition for laser engraving layer by means of heat to thus obtain a relief printing plate precursor having a relief-forming layer, <16> a process for making a relief printing plate, comprising a layer formation step of forming a relief-forming layer from the resin composition for laser engraving according to any one of <1> to <11> above, a crosslinking step of crosslinking the relief-forming layer by light and/or heat to thus obtain a relief printing plate precursor having a crosslinked relief-forming layer, and an engraving step of laser-engraving the relief printing plate precursor having a crosslinked relief-forming layer to thus form a relief layer, <17> a relief printing plate having a relief layer made by the process for making a relief printing plate according to <16> above, <18> the relief printing plate according to <17> above, wherein the relief layer has a thickness of at least 0.05 mm but no greater than 10 mm, and <19> the relief printing plate according to <17> or <18> above, wherein the relief layer has a Shore A hardness of at least 50° but no greater than 90°.

MODE FOR CARRYING OUT THE INVENTION

The present invention is explained in detail below.
(Resin Composition for Laser Engraving)

The resin composition for laser engraving of the present invention (hereinafter, also simply called a 'resin composition') comprises (Component A) a compound having a hydrolyzable silyl group and/or a silanol group, (Component B) a depolymerization catalyst and/or a depolymerization catalyst precursor, and (Component C) a depolymerizable binder polymer.

In the present invention, the notation 'lower limit to upper limit', which expresses a numerical range, means 'at least the lower limit but no greater than the upper limit', and the notation 'upper limit to lower limit' means 'no greater than the upper limit but at least the lower limit'. That is, they are numerical ranges that include the upper limit and the lower limit.

Since the resin composition for laser engraving of the present invention has high engraving sensitivity when applied to laser engraving and excellent rinsing properties for engraving residue, the time taken for forming a relief layer and making a plate can be reduced. The resin composition of the present invention having such characteristics may be used without any particular limitation in a wide range of other applications in addition to a relief-forming layer of a relief printing starting plate that is subjected to laser engraving. For example, it may be used not only in formation of a relief-forming layer of a printing starting plate for which formation of a raised relief is carried out by laser engraving, which is described in detail later, but also in formation of another material form in which asperities or apertures are formed on the surface, for example, various types of printing plates or various types of moldings in which an image is formed by laser engraving, such as an intaglio plate, a stencil plate, or a stamp.

Among them, a preferred embodiment is use in formation of a relief-forming layer provided on an appropriate support.

In accordance with coexisting Component A, Component B, and Component C, the resin composition for laser engraving of the present invention further improves rinsing properties.

(Component C) a depolymerizable binder polymer of the resin composition for laser engraving of the present invention has a property that a part of main chain of the polymer can be thermally decomposed in comparatively low temperature such as 250° C. to 350° C. and that the polymer can be depolymerized (which is a reverse reaction of polymerization reaction and the polymer is thermally decomposed to a low molecular-weight monomer unit of a starting material.) from this decomposition part.

It is surmised that, particularly when a near infrared laser is used in laser engraving, the thermal decomposition is constituted five processes consisting of (1) a light absorption of a compound having a maximum absorption wavelength at 700 to 1,300 nm, (2) a photothermal conversion by a compound having a maximum absorption wavelength at 700 to 1,300 nm, (3) a heat transfer from a compound having a maximum absorption wavelength at 700 to 1,300 nm to a binder polymer existing in the neighborhood of the compound, (4) the thermal decomposition of the binder polymer, and (5) a volatizing of a decomposed binder polymer.

It is surmised that, since (Component C) a depolymerizable binder polymer has above-mentioned low temperature thermal decomposition property and depolymerization property, the process (4) is promoted by the low temperature thermal decomposition, and moreover, since a low molecular-weight monomer generated from the depolymerization is immediately volatilized, the process (5) is occurred very effectively, and that (Component C) a depolymerizable binder polymer becomes very high laser engraving sensitivity by the above-mentioned two effects.

Furthermore, it is surmised that a laser engraving area becomes extremely high temperature, and that a depolymerization of Component C is promoted by a depolymerization catalyst (that is, the thermal decomposition temperature is fallen.).

In the present specification, when a relief printing starting plate is explained, a layer that comprises the binder polymer (Component C), that serves as an image-forming layer subjected to laser engraving, that has a flat surface, and that is an uncrosslinked crosslinkable layer is called a relief-forming layer, a layer that is formed by crosslinking the relief-forming layer is called a crosslinked relief-forming layer, and a layer that has asperities formed on the surface by laser engraving the crosslinked relief-forming layer is called a relief layer. Furthermore, '(Component A) a compound having a hydrolyzable silyl group and/or a silanol group' etc. is also called 'Component A' etc. as appropriate.

Constituent components of the resin composition for laser engraving are explained below.

<(Component A) Compound Having Hydrolyzable Silyl Group and/or Silanol Group>

The 'hydrolyzable silyl group' of (Component A) a compound having a hydrolyzable silyl group and/or a silanol group used in the resin composition for laser engraving of the present invention is a silyl group that is hydrolyzable; examples of hydrolyzable groups include an alkoxy group, a mercapto group, a halogen atom, an amide group, an acetoxy group, an amino group, and an isopropenoxy group. A silyl group is hydrolyzed to become a silanol group, and a silanol group undergoes dehydration-condensation to form a siloxane bond. Such a hydrolyzable silyl group or silanol group is preferably one represented by Formula (1) below.

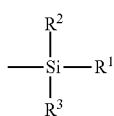
(1)

In Formula (1) above, at least one of $R^1$ to $R^3$ denotes a hydrolyzable group selected from the group consisting of an alkoxy group, a mercapto group, a halogen atom, an amide group, an acetoxy group, an amino group, and an isopropenoxy group, or a hydroxy group. The remainder of $R^1$ to $R^3$ independently denote a hydrogen atom, a halogen atom, or a monovalent organic substituent (examples including an alkyl group, an aryl group, an alkenyl group, an alkynyl group, and an aralkyl group).

In Formula (1) above, the hydrolyzable group bonded to the silicon atom is particularly preferably an alkoxy group or a halogen atom, and more preferably an alkoxy group.

From the viewpoint of rinsing properties and printing durability, the alkoxy group is preferably an alkoxy group having 1 to 30 carbon atoms, more preferably an alkoxy group having 1 to 15 carbon atoms, yet more preferably an alkoxy group having 1 to 5 carbon atoms, particularly preferably an alkoxy group having 1 to 3 carbon atoms, and most preferably a methoxy group or an ethoxy group.

Furthermore, examples of the halogen atom include an F atom, a Cl atom, a Br atom, and an I atom, and from the viewpoint of ease of synthesis and stability it is preferably a Cl atom or a Br atom, and more preferably a Cl atom.

Component A in the present invention is preferably a compound having one or more groups represented by Formula (1) above, and more preferably a compound having two or more. A compound having two or more hydrolyzable silyl groups is particularly preferably used. That is, a compound having in the molecule two or more silicon atoms having a hydrolyzable group bonded thereto is preferably used. The number of silicon atoms having a hydrolyzable group bond thereto contained in Component A is preferably at least 2 but no greater than 6, and most preferably 2 or 3.

A range of 1 to 4 of the hydrolyzable groups may bond to one silicon atom, and the total number of hydrolyzable groups in Formula (1) is preferably in a range of 2 or 3. It is particularly preferable that three hydrolyzable groups are bonded to a silicon atom. When two or more hydrolyzable groups are bonded to a silicon atom, they may be identical to or different from each other.

Specific preferred examples of the alkoxy group include a methoxy group, an ethoxy group, a propoxy group, an isopropoxy group, a butoxy group, a tent-butoxy group, a phenoxy group, and a benzyloxy group. A plurality of each of these alkoxy groups may be used in combination, or a plurality of different alkoxy groups may be used in combination.

Examples of the alkoxysilyl group having an alkoxy group bonded thereto include a trialkoxysilyl group such as a trimethoxysilyl group, a triethoxysilyl group, a triisopropoxysilyl group, or a triphenoxysilyl group; a dialkoxymonoalkylsilyl group such as a dimethoxymethylsilyl group or a diethoxymethylsilyl group; and a monoalkoxydialkylsilyl group such as a methoxydimethylsilyl group or an ethoxydimethylsilyl group.

Component A preferably has at least a sulfur atom, an ester bond, a urethane bond, an ether bond, a urea bond, or an imino group. The ester bond is preferably a carboxylate ester bond. Among them, from the viewpoint of crosslinkability, Component A preferably comprises a sulfur atom, and from the viewpoint of removability (rinsing properties) of engraving residue it is preferable for it to comprise an ester bond, a urethane bond, or an ether bond (in particular, an ether bond contained in an oxyalkylene group), which is easily decomposed by aqueous alkali.

Furthermore, Component A in the present invention is preferably a compound that does not have an ethylenically unsaturated bond.

As Component A in the present invention, there can be cited a compound in which a plurality of groups represented by Formula (1) above are bonded via a divalent linking group, and from the viewpoint of the effect, such a divalent linking group is preferably a linking group having a sulfide group (—S—), an imino group (—N(R)—) or a urethane bond (—OCON(R)— or —N(R)COO—). R denotes a hydrogen atom or a substituent. Examples of the substituent denoted by R include an alkyl group, an aryl group, an alkenyl group, an alkynyl group, and an aralkyl group.

A method for synthesizing Component A is not particularly limited, and synthesis can be carried out by a known method. As one example, a representative synthetic method for a Component A containing a linking group having the above-mentioned specific structure is shown below.

<Synthetic Method for Compound Having Sulfide Group as Linking Group and Having Hydrolyzable Silyl Group and/or Silanol Group>

A synthetic method for a Component A having a sulfide group as a linking group (hereinafter, called as appropriate a 'sulfide linking group-containing Component A') is not particularly limited, but specific examples thereof include reaction of a Component A having a halogenated hydrocarbon group with an alkali metal sulfide, reaction of a Component A having a mercapto group with a halogenated hydrocarbon, reaction of a Component A having a mercapto group with a Component A having a halogenated hydrocarbon group, reaction of a Component A having a halogenated hydrocarbon group with a mercaptan, reaction of a Component A having an ethylenically unsaturated double bond with a mercaptan, reaction of a Component A having an ethylenically unsaturated double bond with a Component A having a mercapto group, reaction of a compound having an ethylenically unsaturated double bond with a Component A having a mercapto group, reaction of a ketone with a Component A having a mercapto group, reaction of a diazonium salt with a Component A having a mercapto group, reaction of a Component A having a mercapto group with an oxirane, reaction of a Component A having a mercapto group with a Component A having an oxirane group, reaction of a mercaptan with a Component A having an oxirane group, and reaction of a Component A having a mercapto group with an aziridine.

<Synthetic Method for Compound Having Imino Group as Linking Group and Having Hydrolyzable Silyl Group and/or Silanol Group>

A synthetic method for a Component A having an imino group as a linking group (hereinafter, called as appropriate an 'imino linking group-containing Component A') is not particularly limited, but specific examples include reaction of a Component A having an amino group with a halogenated hydrocarbon, reaction of a Component A having an amino group with a Component A having a halogenated hydrocarbon group, reaction of a Component A having a halogenated hydrocarbon group with an amine, reaction of a Component A having an amino group with an oxirane, reaction of a Component A having an amino group with a Component A having an oxirane group, reaction of an amine with a Component A having an oxirane group, reaction of a Component A having an amino group with an aziridine, reaction of a Component A having an ethylenically unsaturated double bond with an amine, reaction of a Component A having an ethylenically unsaturated double bond with a Component A having an amino group, reaction of a compound having an ethylenically unsaturated double bond with a Component A having an amino group, reaction of a compound having an acetylenically unsaturated triple bond with a Component A having an amino group, reaction of a Component A having an imine-based unsaturated double bond with an organic alkali metal compound, reaction of a Component A having an imine-based unsaturated double bond with an organic alkaline earth metal compound, and reaction of a carbonyl compound with a Component A having an amino group.

<Synthetic Method for Compound Having Urea Bond (Ureylene Group) as Linking Group and Having Hydrolyzable Silyl Group and/or Silanol Group>

A synthetic method for Component A having an ureylene group (hereinafter, called as appropriate a 'ureylene linking group-containing Component A') as a linking group is not particularly limited, but specific examples include synthetic methods such as reaction of a Component A having an amino group with an isocyanate ester, reaction of a Component A having an amino group with a Component A having an isocyanate ester, and reaction of an amine with a Component A having an isocyanate ester.

Component A is preferably a compound represented by Formula (A-1) or Formula (A-2) below.

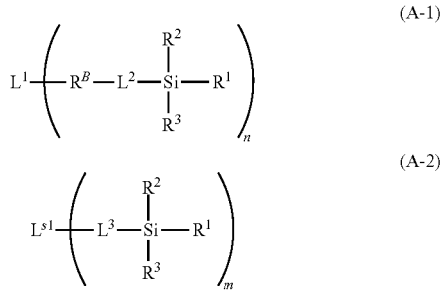

(In Formula (A-1) and Formula (A-2), $R^B$ denotes an ester bond, an amide bond, a urethane bond, a urea bond, or an imino group, $L^1$ denotes an n-valent linking group, $L^2$ denotes a divalent linking group, $L^{s1}$ denotes an m-valent linking group, $L^3$ denotes a divalent linking group, n and m independently denote an integer of 1 or greater, and $R^1$ to $R^3$ independently denote a hydrogen atom, a halogen atom, or a monovalent organic substituent. In addition, at least one of $R^1$ to $R^3$ denotes a hydrolyzable group selected from the group consisting of an alkoxy group, a mercapto group, a halogen atom, an amide group, an acetoxy group, an amino group, and an isopropenoxy group, or a hydroxy group.)

$R^1$ to $R^3$ in Formula (A-1) and Formula (A-2) above have the same meanings as those of $R^1$ to $R^3$ in Formula (1) above, and preferred ranges are also the same.

From the viewpoint of rinsing properties and film strength, $R^B$ above is preferably an ester bond or a urethane bond, and is more preferably an ester bond. The ester bond is preferably a carboxylate ester bond.

The divalent or n-valent linking group denoted by $L^1$ to $L^3$ above is preferably a group formed from at least one type of atom selected from the group consisting of a carbon atom, a hydrogen atom, an oxygen atom, a nitrogen atom, and a sulfur atom, and is more preferably a group formed from at least one type of atom selected from the group consisting of a carbon atom, a hydrogen atom, an oxygen atom, and a sulfur atom. The number of carbon atoms of $L^1$ to $L^3$ above is preferably 2 to 60, and more preferably 2 to 30. $L^3$ preferably does not contain an ester bond, an amide bond, a urethane bond, a urea bond, and an imino group.

The m-valent linking group denoted by $L^{s1}$ above is preferably a group formed from a sulfur atom and at least one type of atom selected from the group consisting of a carbon atom, a hydrogen atom, an oxygen atom, a nitrogen atom, and a sulfur atom, and is more preferably an alkylene group or a group formed by combining two or more from an alkylene group, a sulfide group, and an imino group. The number of carbon atoms of $L^{s1}$ above is preferably 2 to 60, and more preferably 6 to 30.

n and m above are independently integers of 1 to 10, more preferably integers of 2 to 10, yet more preferably integers of 2 to 6, and particularly preferably 2.

From the viewpoint of removability (rinsing properties) of engraving residue, the n-valent linking group denoted by $L^1$ and/or the divalent linking group denoted by $L^2$, or the divalent linking group denoted by $L^3$ preferably has an ether bond, and more preferably has an ether bond contained in an oxyalkylene group.

Furthermore, $L^{s1}$ and $L^3$ above preferably do not have an ester bond, an amide bond, a urethane bond, a urea bond, or an imino group.

Among compounds represented by Formula (A-1) or Formula (A-2), from the viewpoint of crosslinkability, etc., the n-valent linking group denoted by $L^1$ and/or the divalent linking group denoted by $L^2$ in Formula (A-1) are preferably groups having a sulfur atom.

Specific examples of Component A that can be used to the present invention are shown below. Examples thereof include vinyltrichlorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, p-styryltrimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane, γ-mercaptopropyltrimethoxysilane, mercaptopropyltriethoxysilane, mercaptomethyltrimethoxysilane, dimethoxy-3-mercaptopropylmethylsilane, 2-(2-aminoethylthioethyl)diethoxymethylsilane, 3-(2-acetoxyethylthiopropyl)dimethoxymethylsilane, 2-(2-aminoethylthioethyl)triethoxysilane, dimethoxymethyl-3-(3-phenoxypropylthiopropyl)silane, bis(triethoxysilylpropyl)disulfide, bis(triethoxysilylpropyl)tetrasulfide, 1,4-bis(triethoxysilyl)benzene, bis(triethoxysilyl)ethane, 1,6-bis(trimethoxysilyl)hexane, 1,8-bis(triethoxysilyl)octane, 1,2-bis(trimethoxysilyl)decane, bis(triethoxysilylpropyl)amine, bis(trimethoxysilylpropyl)urea, γ-chloropropyltrimethoxysilane, γ-ureidopropyltriethoxysilane, trimethylsilanol, diphenylsilanediol, and triphenylsilanol. Other than the above, the compounds shown below can be cited as preferred examples, but the present invention should not be construed as being limited thereto.

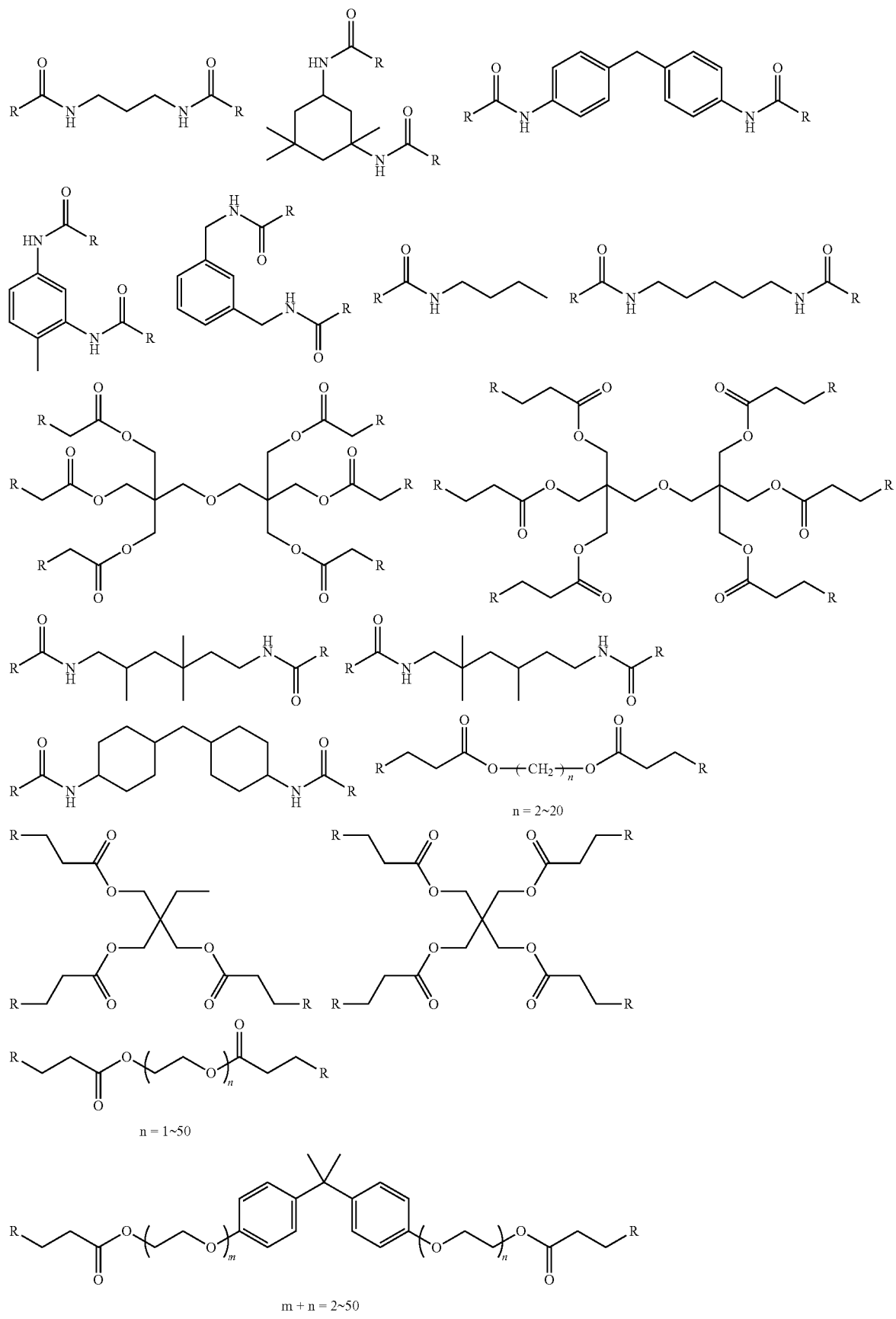

-continued
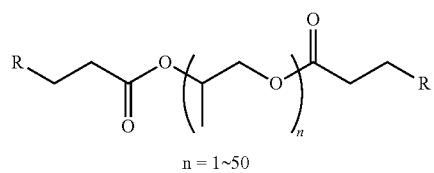
n = 1~50
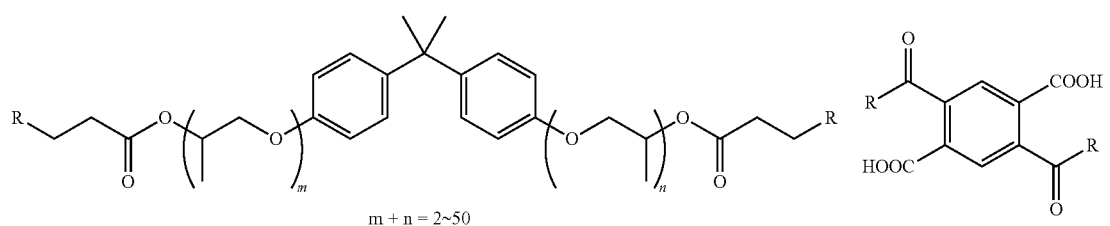
m + n = 2~50
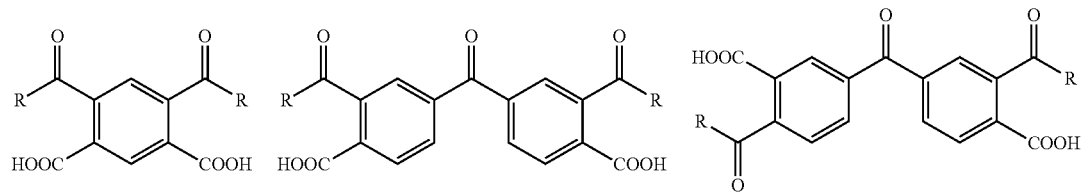
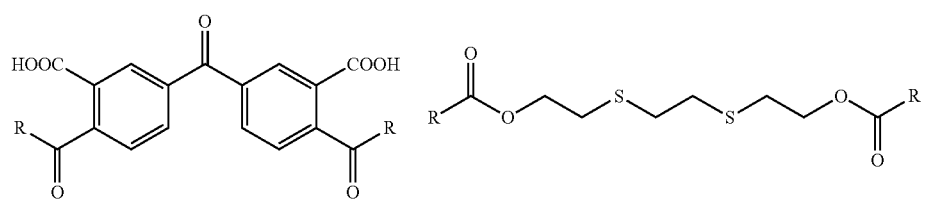
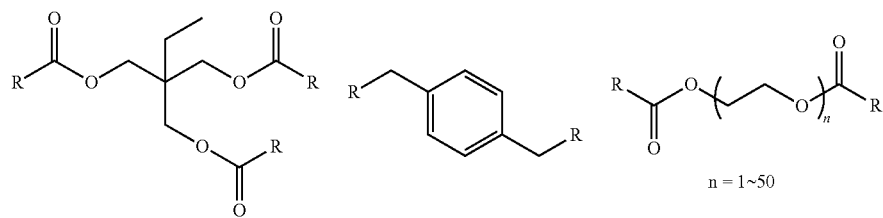
n = 1~50
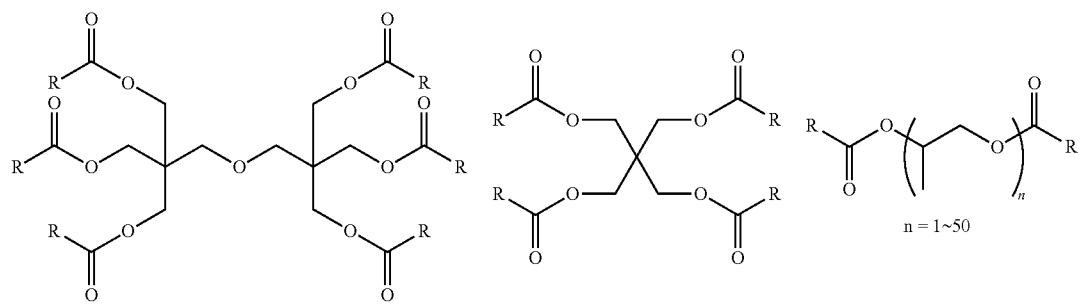
n = 1~50
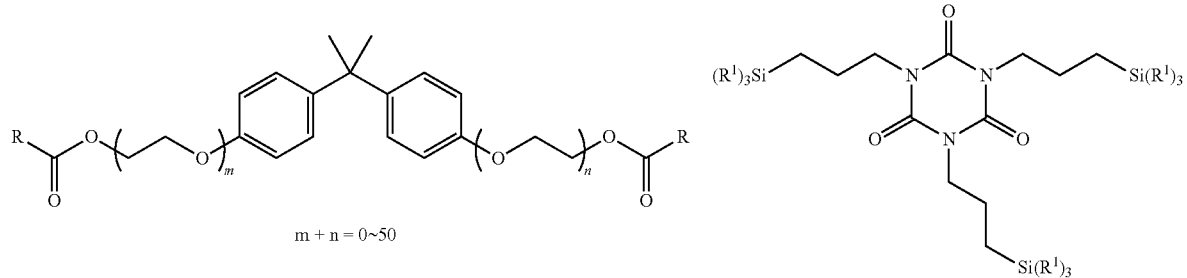
m + n = 0~50

-continued

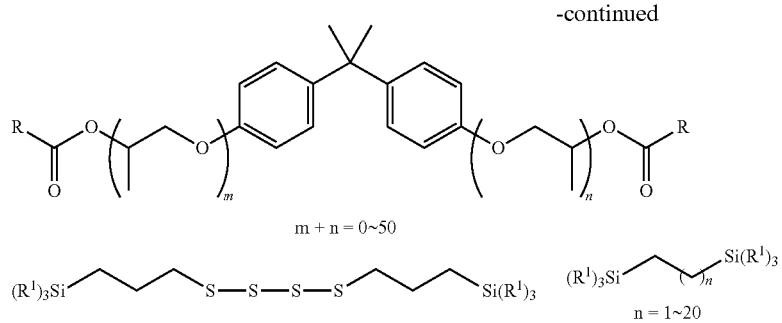

m + n = 0~50

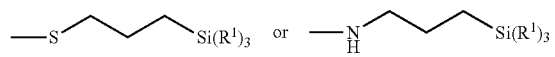

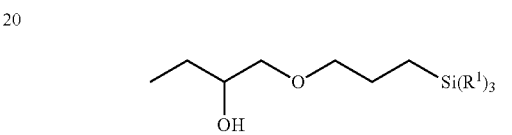

n = 1~20

In each of the formulae above, R denotes a partial structure selected from the structures below. When a plurality of Rs and $R^1$s are present in the molecule, they may be identical to or different from each other, and are preferably identical to each other in terms of synthetic suitability.

R:

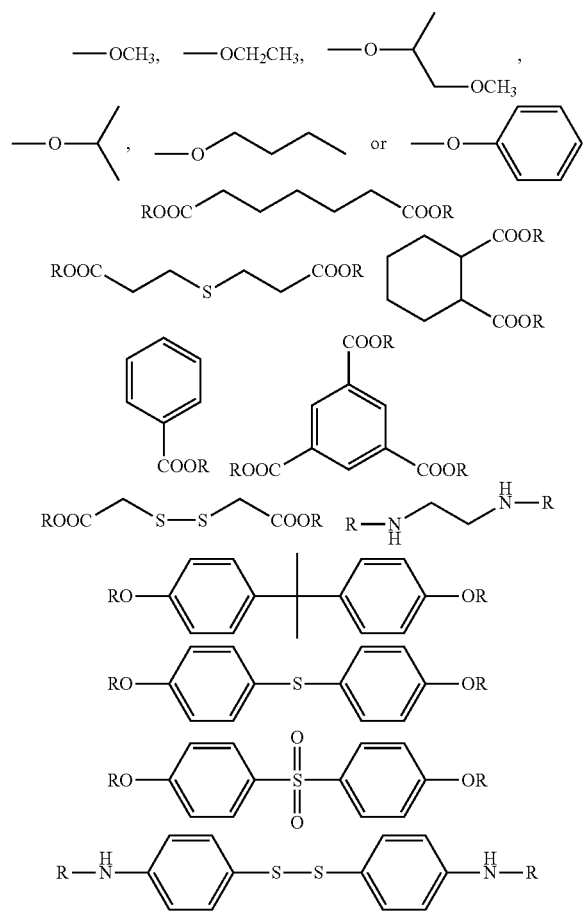

In each of the formulae above, R denotes a partial structure selected from the structures below. When a plurality of Rs and $R^1$s are present in the molecule, they may be identical to or different from each other, and are preferably identical to each other in terms of synthetic suitability.

R:

Component A may be obtained by synthesis as appropriate, but use of a commercially available product is preferable in terms of cost. Since Component A corresponds to for example commercially available silane products or silane coupling agents from Shin-Etsu Chemical Co., Ltd., Dow Corning Toray, Momentive Performance Materials Inc., Chisso Corporation, etc., the resin composition of the present invention may employ such a commercially available product by appropriate selection according to the intended application.

As Component A in the present invention, a partial hydrolysis-condensation product obtained using one type of compound having a hydrolyzable silyl group and/or a silanol group or a partial cohydrolysis-condensation product obtained using two or more types may be used. Hereinafter, these compounds may be called 'partial (co)hydrolysis-condensation products'.

Among silane compounds as partial (co)hydrolysis-condensation product precursors, from the viewpoint of versatility, cost, and film compatibility, a silane compound having a substituent selected from a methyl group and a phenyl group as a substituent on the silicon is preferable, and specific preferred examples of the precursor include methyltrimethoxysilane, methyltriethoxysilane, phenyltrimethoxysilane, phenyltriethoxysilane, dimethyldimethoxysilane, dimethyldiethoxysilane, diphenyldimethoxysilane, and diphenyldiethoxysilane.

In this case, as a partial (co)hydrolysis-condensation product, it is desirable to use a dimer (2 moles of silane compound is reacted with 1 mole of water to eliminate 2 moles of alcohol, thus giving a disiloxane unit) to 100-mer of the above-mentioned silane compound, preferably a dimer to 50-mer, and yet more preferably a dimer to 30-mer, and it is also possible to use a partial cohydrolysis-condensation product formed using two or more types of silane compounds as starting materials.

As such a partial (co)hydrolysis-condensation product, ones commercially available as silicone alkoxy oligomers may be used (e.g. those from Shin-Etsu Chemical Co., Ltd.) or ones that are produced in accordance with a standard method by reacting a hydrolyzable silane compound with less than an equivalent of hydrolytic water and then removing by-products such as alcohol and hydrochloric acid may be used. When the production employs, for example, an acyloxysilane or an alkoxysilane described above as a hydrolyzable silane compound starting material, which is a precursor, partial hydrolysis-condensation may be carried out using as a reaction catalyst an acid such as hydrochloric acid or sulfuric acid, an alkali metal or alkaline earth metal hydroxide such as sodium hydroxide or potassium hydroxide, or an alkaline organic material such as triethylamine, and when the production is carried out directly from a chlorosilane, water and alcohol may be reacted using hydrochloric acid by-product as a catalyst.

With regard to Component A in the resin composition of the present invention, only one type may be used or two or more types may be used in combination.

The content of Component A contained in the resin composition of the present invention is preferably in the range of 0.1 to 80 weight % on a solids content basis, more preferably in the range of 1 to 40 weight %, and most preferably in the range of 5 to 30 weight %.

<(Component B) Depolymerization Catalyst and/or Depolymerization Catalyst Precursor>

The resin composition for laser engraving of the present invention comprises (Component B) a depolymerization catalyst and/or a depolymerization catalyst precursor. The depolymerization catalyst and a depolymerization catalyst formed from the depolymerization catalyst precursor can promote depolymerization of (Component C) a depolymerizable binder polymer.

The depolymerization catalyst is not particularly limited as long as it can promote depolymerization of (Component C) a depolymerizable binder polymer; a known substance may be used, and examples thereof include a Lewis acid and an organic metal catalyst.

As the Lewis acid, a known Lewis acid may be used; examples thereof include Group 3 to 15 metal Lewis acid compounds such as an aluminum compound, a zinc compound, and a tin compound, and an organic cationic compound. Preferred examples include an aluminum compound, a zinc compound, a tin compound, and a bis(phosphine)iminium compound, more preferred examples include an aluminum compound, a zinc compound, and a bis(phosphine)iminium compound, yet more preferred examples include aluminum chloride, zinc chloride, tin chloride, and the compounds shown below, and particularly preferred examples include the compounds shown below. In the description below, Ph denotes a phenyl group, and a dotted line denotes a coordination bond.

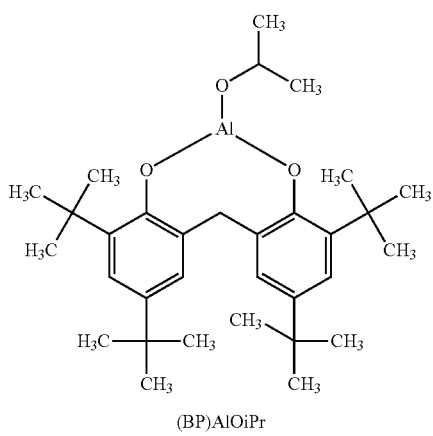

(BP)AlOiPr

Zinc glutarate

PPNCl (BDIEt)ZnOAc (BDIiPr)ZnOAc

Preferred examples of the organic metal catalyst include organic metal catalysts described in U.S. Pat. No. 6,133,402 and the compound shown below, and more preferred examples include the compound shown below.

(salcy)CoOBzF5

The depolymerization catalyst precursor is not particularly limited as long as it can form a depolymerization catalyst; a known substance may be used, and examples thereof include an acid generator and a base generator.

As the acid generator, a known acid generator may be used, and examples thereof include a tosylate anion-containing infrared-absorbing dye (IR dye) and a photo-acid generator.

Examples of the tosylate anion-containing IR dye include IR dyes described in U.S. Pat. No. 7,186,482.

As the photo-acid generator, an ionic photo-acid generator can preferably be cited, and examples thereof include ionic photo-acid generators described in Advances in Resist Technology & Processing XIX, Fedynydshyn (Ed.), Proc. SPIE Vo. 4690 (2002). As commercial photo-acid generators, the WPAG series manufactured by Wako Pure Chemical Industries, Ltd. can preferably be cited.

The resin composition for laser engraving of the present invention may comprise one type on its own or two or more types in combination of depolymerization catalyst and/or depolymerization catalyst precursor (Component B).

The content of Component B contained in the resin composition of the present invention is preferably at least 0.01 weight % relative to the total weight of Component C, and more preferably 0.1 to 10 weight %.

<(Component C) Depolymerizable Binder Polymer>

The resin composition for laser engraving of the present invention comprises (Component C) a depolymerizable binder polymer.

'Depolymerizable' in the present invention means that a polymer can be decomposed by a depolymerization catalyst into a monomer as a main decomposition product.

Preferred examples of the depolymerizable binder polymer (Component C) include a polycyanoacrylate, a polycarbonate, and a polyhydroxycarboxylic acid, and more preferred examples include a polycarbonate.

The weight-average molecular weight Mw of the depolymerizable binder polymer (Component C) is preferably 1,000 to 1,000,000.

The depolymerizable binder polymer (Component C) may be a crystalline resin or a non-crystalline resin.

As the polycyanoacrylate, a polymer having at least a monomer unit represented by Formula (C-1) below is preferable.

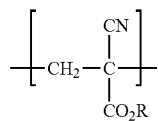

(C-1)

In the Formula, R denotes a monovalent organic group.

The monovalent organic group is preferably an alkyl group or an alkoxyalkyl group, more preferably an alkyl group having 1 to 20 carbons or an alkoxyalkyl group having 1 to 20 carbons, yet more preferably an alkyl group having 1 to 8 carbons or an alkoxyalkyl group having 1 to 8 carbons, and particularly preferably a methyl group, an ethyl group, a methoxyethyl group, or an ethoxyethyl group.

The polycyanoacrylate may be a homopolymer or a copolymer. The copolymer may be a copolymer in which two or more types of cyanoacrylates are polymerized or a copolymer in which one or more types of cyanoacrylates and one or more types of other polymerizable compounds are polymerized.

The cyanoacrylate used in synthesis of the polycyanoacrylate is preferably a 2-cyanoacrylate.

Examples of other polymerizable compounds include, but are not particularly limited to, a (meth)acrylate, a (meth)acrylamide, a vinyl ether, a butadiene, a (meth)acrylic acid, a vinylpyridine, a vinylphosphoric acid, a vinylsulfonic acid, and a styrene.

Preferred examples of the polycyanoacrylate include a polyalkylcyanoacrylate and a polyalkoxyalkylcyanoacrylate, and more preferred examples include poly(methyl 2-cyanoacrylate), poly(ethyl 2-cyanoacrylate), poly(methoxyethyl 2-cyanoacrylate), poly(ethoxyethyl 2-cyanoacrylate), and a copolymer of methyl 2-cyanoacrylate and ethyl 2-cyanoacrylate.

Examples of the polycyanoacrylate include polycyanoacrylates described in U.S. Pat. Nos. 5,998,088, 5,605,780, and 5,691,114.

As one example of depolymerization of a polycyanoacrylate, when a polymer having at least a monomer unit represented by Formula (C-1) is taken as an example, the reaction shown below progresses.

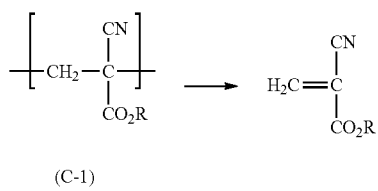

(C-1)

The polycarbonate is preferably a polymer having at least a constituent unit represented by Formula (C-2) or Formula (C-3).

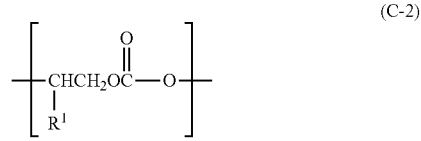

(C-2)

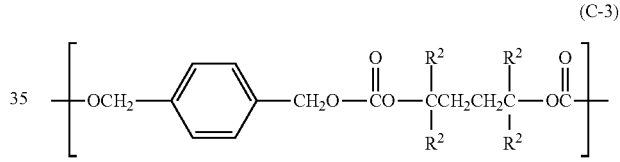

(C-3)

In the formula, $R^1$ denotes an alkyl group having 1 to 30 carbons, and the $R^2$s independently denote an alkyl group having 1 to 10 carbons.

The alkyl group denoted by $R^1$ above may be straight-chain, have a branch, or have a ring structure, and may have a substituent. The substituent is not particularly limited as long as it is not a group that greatly inhibits the effects of the present invention as a resin composition, a relief printing plate precursor, and a relief printing plate.

Furthermore, the number of carbons of the alkyl group denoted by $R^1$ above is preferably 1 to 8, more preferably 1 to 4, and particularly preferably 1.

The alkyl group denoted by $R^2$ above may be straight-chain, have a branch, or have a ring structure.

Furthermore, the number of carbons of the alkyl group denoted by $R^2$ above is preferably 1 to 8, more preferably 1 to 4, and particularly preferably 1.

Specific examples of the polycarbonate include polypropylene carbonate.

Examples of the polycarbonate include polycarbonates described in U.S. Pat. No. 5,156,936.

As one example of depolymerization of a polycarbonate, when a polymer having at least a constituent unit represented by Formula (C-2) or Formula (C-3) is taken as an example, the reaction shown below progresses.

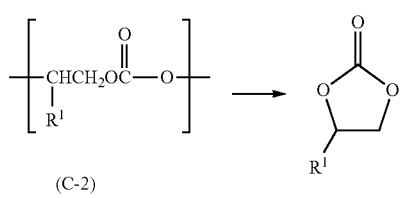

(C-2)

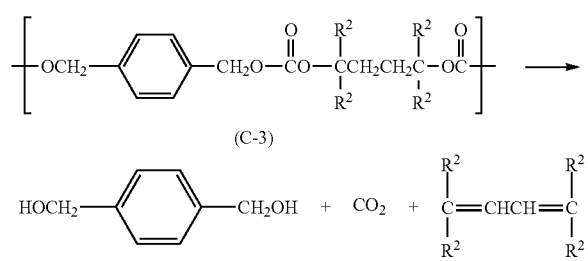

(C-3)

The polyhydroxycarboxylic acid is preferably a polymer having at least a constituent unit represented by Formula (C-4) below.

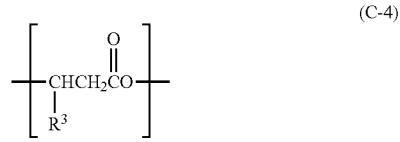

(C-4)

In the Formula, $R^3$ denotes an alkyl group having 1 to 30 carbons.

The alkyl group denoted by $R^3$ above may be straight-chain, have a branch, or have a ring structure.

Furthermore, the number of carbons of the alkyl group denoted by $R^3$ above is preferably 1 to 8, more preferably 1 to 4, and particularly preferably 1.

Specific examples of the polyhydroxycarboxylic acid include polylactic acid.

As one example of depolymerization of a polyhydroxycarboxylic acid, when a polymer having at least a constituent unit represented by Formula (C-4) is taken as an example, the reaction shown below progresses.

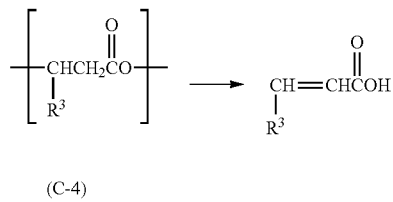

(C-4)

With regard to Component C in the resin composition of the present invention, only one type may be used or two or more types may be used in combination.

The content of Component C contained in the resin composition of the present invention is, from the viewpoint of a balance being obtained between shape retention, water resistance, and engraving sensitivity of a coating, preferably 2 to 95 weight % of the total solids content, more preferably 5 to 80 weight %, and particularly preferably 10 to 60 weight %.

<(Component D) Catalyst for Promoting Hydrolysis Reaction and/or Condensation Reaction of Component A>

The resin composition of the present invention preferably comprises (Component D) a catalyst for promoting a hydrolysis reaction and/or condensation reaction of Component A.

As the catalyst, a reaction catalyst that is normally used in a silane coupling reaction may be used without any restrictions, and preferred examples thereof include an acidic catalyst, a basic catalyst, and a metal complex catalyst.

As the acidic catalyst and the basic catalyst, it is preferable to use an acidic or basic compound as it is or in the form of a solution in which it is dissolved in a solvent such as water or an organic solvent (hereinafter, called an acidic catalyst or basic catalyst respectively). The concentration when dissolved in a solvent is not particularly limited, and it may be selected appropriately according to the properties of the acidic or basic compound used, desired catalyst content, etc.

The type of acidic catalyst and basic catalyst is not particularly limited; specific examples thereof include, as the acidic catalyst, a hydrogen halide such as hydrochloric acid, nitric acid, sulfuric acid, sulfurous acid, hydrogen sulfide, perchloric acid, hydrogen peroxide, carbonic acid, a carboxylic acid such as formic acid or acetic acid, a substituted carboxylic acid in which R of the structural formula RCOOH is substituted with another element or substituent, a sulfonic acid such as benzenesulfonic acid, phosphoric acid, a heteropoly acid, and an inorganic solid acid and, as the basic catalyst, an ammoniacal base such as aqueous ammonia, an amine such as ethylamine or aniline, an alkali metal hydroxide, an alkali metal alkoxide, an alkaline earth oxide, a quaternary ammonium salt compound, and a quaternary phosphonium salt compound.

Preferred examples of the metal complex catalyst include those constituted from a metal element selected from Groups 2, 3, 4, and 5 of the periodic table and an oxo or hydroxy oxygen compound selected from a β-diketone, a ketoester, a hydroxycarboxylic acid or an ester thereof, an amino alcohol, and an enolic active hydrogen compound.

Among them, Component D is preferably an acidic or basic compound, and particularly preferably phosphoric acid or 1,8-diazabicyclo[5.4.0]undec-7-ene (DBU).

With regard to Component D in the resin composition of the present invention, only one type thereof may be used or two or more types thereof may be used in combination.

The content of Component D in the resin composition of the present invention is preferably 0.01 to 20 weight % relative to the total weight of Component C, and more preferably 0.1 to 10 weight %.

<(Component E) Polymerizable Compound>

In the present invention, from the viewpoint of forming a crosslinked structure in a relief-forming layer, in order to form this structure it is preferable for the resin composition for laser engraving of the present invention to comprise a polymerizable compound.

The polymerizable compound may be selected freely from compounds having at least one ethylenically unsaturated bond, preferably at least two, more preferably two to six, and yet more preferably two. Furthermore, the polymerizable compound is a compound that is different from Component B and is preferably a compound having an ethylenically unsaturated bond at a molecular terminal. Moreover, the molecular weight (weight-average molecular weight) of the polymerizable compound is preferably less than 5,000.

The polymerizable compound is not particularly limited; known compounds may be used, and examples include those described in paragraphs 0098 to 0124 of JP-A-2009-204962.

A monofunctional monomer having one ethylenically unsaturated bond in the molecule and a polyfunctional monomer having two or more of ethylenically unsaturated bonds in the molecule, which are used as the polymerizable compound, are explained below.

Since it is necessary to form a crosslinked structure in a relief-forming layer of the relief printing starting plate for laser engraving of the present invention, a polyfunctional monomer is preferably used. The molecular weight of these polyfunctional monomers is preferably 120 to 3,000, and more preferably 200 to 2,000.

Examples of the monofunctional monomer and polyfunctional monomer include an ester of an unsaturated carboxylic acid (e.g. acrylic acid, methacrylic acid, itaconic acid, crotonic acid, isocrotonic acid, maleic acid, etc.) and a polyhydric alcohol compound and an amide of an unsaturated carboxylic acid and a polyvalent amine compound.

From the viewpoint of improving engraving sensitivity, it is preferable in the present invention to use as the polymerizable compound a compound having a sulfur atom in the molecule.

As such a polymerizable compound having a sulfur atom in the molecule, it is preferable from the viewpoint of improving engraving sensitivity in particular to use a polymerizable compound having two or more ethylenically unsaturated bonds and having a carbon-sulfur bond at a site where two ethylenically unsaturated bonds among them are linked (hereinafter, called a 'sulfur-containing polyfunctional monomer' as appropriate).

Examples of carbon-sulfur bond-containing functional groups of the sulfur-containing polyfunctional monomer in the present invention include sulfide, disulfide, sulfoxide, sulfonyl, sulfonamide, thiocarbonyl, thiocarboxylic acid, dithiocarboxylic acid, sulfamic acid, thioamide, thiocarbamate, dithiocarbamate, and thiourea-containing functional groups.

Furthermore, a linking group containing a carbon-sulfur bond linking two ethylenically unsaturated bonds of the sulfur-containing polyfunctional monomer is preferably at least one unit selected from —C—S—, —C—S—S—, —NHC(=S)O—, —NHC(=O)S—, —NHC(=S)S—, and —C—SO$_2$—.

Moreover, the number of sulfur atoms contained in the sulfur-containing polyfunctional monomer molecule is not particularly limited as long as it is one or more, and may be selected as appropriate according to the intended application, but from the viewpoint of a balance between engraving sensitivity and solubility in a coating solvent it is preferably 1 to 10, more preferably 1 to 5, and yet more preferably 1 or 2.

On the other hand, the number of ethylenically unsaturated bond sites contained in the sulfur-containing polyfunctional monomer molecule is not particularly limited as long as it is two or more and may be selected as appropriate according to the intended application, but from the viewpoint of flexibility of a crosslinked film it is preferably 2 to 10, more preferably 2 to 6, and yet more preferably 2 to 4.

From the viewpoint of flexibility of a film that is formed, the molecular weight of the sulfur-containing polyfunctional monomer in the present invention is preferably 120 to 3,000, and more preferably 120 to 1,500.

Furthermore, the sulfur-containing polyfunctional monomer in the present invention may be used on its own or as a mixture with a polyfunctional polymerizable compound or monofunctional polymerizable compound having no sulfur atom in the molecule.

Moreover, examples of the polymerizable compound having a sulfur atom in the molecule include those described in JP-A-2009-255510.

In accordance with the use of a polymerizable compound such as a sulfur-containing polyfunctional monomer in the resin composition of the present invention, it is possible to adjust film physical properties such as brittleness and flexibility of a crosslinked relief-forming layer of a lithographic printing plate for laser engraving.

Furthermore, from the viewpoint of flexibility or brittleness of a crosslinked film, the content of Component E in the resin composition of the present invention is preferably 5 to 60 weight % on a solids content basis, and more preferably 8 to 30 weight %.

<(Component F) Polymerization Initiator>

When the resin composition for laser engraving of the present invention is used for preparing a relief-forming layer, it preferably further comprises (Component F) a polymerization initiator, and it is preferable to use this in combination with Component E.

As the polymerization initiator, a radical polymerization initiator is preferable.

Examples of the radical polymerization initiator include an aromatic ketone, an onium salt compound, an organic peroxide, a thio compound, a hexaarylbiimidazole compound, a ketoxime ester compound, a borate compound, an azinium compound, a metallocene compound, an active ester compound, a carbon-halogen bond-containing compound, and an azo-based compound. Among them, from the viewpoint of engraving sensitivity and good relief edge shape when applied to a relief-forming layer of a relief printing starting plate, an organic peroxide and an azo-based compound are preferable, and an organic peroxide is particularly preferable.

As the polymerization initiator, preferred examples thereof include compounds described in paragraphs 0074 to 0118 of JP-A-2008-63554.

With regard to Component F in the present invention, one type may be used on its own or two or more types may be used in combination.

The content of Component F in the resin composition for laser engraving of the present invention is preferably 0.01 to 10 weight % relative to the total solids content by weight of the relief-forming layer, and more preferably 0.1 to 3 weight %. When the content of the polymerization initiator is at least 0.01 weight %, an effect from the addition thereof is obtained, and crosslinking of a crosslinkable relief-forming layer proceeds promptly. Furthermore, when the content is no greater than 10 weight %, other components do not become insufficient, and printing durability that is satisfactory as a relief printing plate is obtained.

<(Component G) Photothermal Conversion Agent>

The resin composition for laser engraving of the present invention preferably further comprises a photothermal conversion agent.

It is surmised that the photothermal conversion agent absorbs laser light and generates heat thus promoting thermal decomposition of a cured material of the resin composition for laser engraving of the present invention. Because of this, it is preferable to select a photothermal conversion agent that absorbs light having the wavelength of the laser that is used for engraving.

When a laser (a YAG laser, a semiconductor laser, a fiber laser, a surface emitting laser, etc.) emitting infrared at a wavelength of 700 to 1,300 nm is used as a light source for laser engraving, it is preferable for the relief-forming layer in the present invention to comprise a photothermal conversion agent that can absorb light having a wavelength of 700 to 1,300 nm.

As the photothermal conversion agent in the present invention, various types of dye or pigment are used.

With regard to the photothermal conversion agent, examples of dyes that can be used include commercial dyes and known dyes described in publications such as 'Senryo Binran' (Dye Handbook) (Ed. by The Society of Synthetic Organic Chemistry, Japan, 1970). Specific examples preferably include dyes having a maximum absorption wavelength at 700 to 1,300 nm, such as azo dyes, metal complex salt azo dyes, pyrazolone azo dyes, naphthoquinone dyes, anthraquinone dyes, phthalocyanine dyes, carbonium dyes, diimmonium compounds, quinone imine dyes, methine dyes, cyanine dyes, squarylium colorants, pyrylium salts, and metal thiolate complexes. Examples of dyes that can be used in the present invention include cyanine-based dyes such as heptamethine cyanine dyes, oxonol-based dyes such as pentamethine oxonol dyes, phthalocyanine-based dyes, and dyes described in paragraphs 0124 to 0137 of JP-A-2008-63554.

With regard to the photothermal conversion agent used in the present invention, examples of pigments include commercial pigments and pigments described in the Color Index (C.I.) Handbook, 'Saishin Ganryo Binran' (Latest Pigments Handbook) (Ed. by Nippon Ganryo Gijutsu Kyokai, 1977), 'Saisin Ganryo Ouyogijutsu' (Latest Applications of Pigment Technology) (CMC Publishing, 1986), 'Insatsu Inki Gijutsu' (Printing Ink Technology) (CMC Publishing, 1984). Examples include pigments described in paragraphs 0122 to 0125 of JP-A-2009-178869. Among these pigments, carbon black is preferable.

Any carbon black, regardless of classification by ASTM and application (e.g. for coloring, for rubber, for dry cell, etc.), may be used as long as dispersibility, etc. in the composition is stable. Carbon black includes for example furnace black, thermal black, channel black, lamp black, and acetylene black. In order to make dispersion easy, a black colorant such as carbon black may be used as color chips or a color paste by dispersing it in nitrocellulose or a binder in advance using, as necessary, a dispersant, and such chips and paste are readily available as commercial products. Examples include carbon blacks described in paragraphs 0130 to 0134 of JPA-2009-178869.

The content of the photothermal conversion agent in the resin composition for laser engraving of the present invention largely depends on the size of the molecular extinction coefficient characteristic to the molecule, and is preferably 0.01 to 30 wt % relative to the total weight of the solids content of the resin composition, more preferably 0.05 to 20 wt %, and yet more preferably 0.1 to 10 wt %.

<Solvent>

From the viewpoint of dissolving and mixing a relatively hydrophobic starting material and a somewhat high polarity starting material with good balance, a solvent used when preparing the resin composition for laser engraving of the present invention is preferably mainly an aprotic organic solvent. The aprotic organic solvent may be used on its own or may be used in combination with a protic organic solvent. More specifically, they are used preferably at aprotic organic solvent/protic organic solvent=100/0 to 50/50 (ratio by weight), more preferably 100/0 to 70/30, and particularly preferably 100/0 to 90/10.

Specific preferred examples of the aprotic organic solvent include acetonitrile, tetrahydrofuran, dioxane, toluene, propylene glycol monomethyl ether acetate, methyl ethyl ketone, acetone, methyl isobutyl ketone, ethyl acetate, butyl acetate, ethyl lactate, N,N-dimethylacetamide, N-methylpyrrolidone, and dimethyl sulfoxide.

Specific preferred examples of the protic organic solvent include methanol, ethanol, 1-propanol, 2-propanol, 1-butanol, 1-methoxy-2-propanol, ethylene glycol, diethylene glycol, and 1,3-propanediol.

<Other Additives>

The resin composition for laser engraving of the present invention may comprise as appropriate various types of known additives as long as the effects of the present invention are not inhibited. Examples include a filler, a plasticizer, a wax, a process oil, an organic acid, a metal oxide, an antiozonant, an anti-aging agent, a thermopolymerization inhibitor, and a colorant, and one type thereof may be used on its own or two more types may be used in combination.

Preferred examples of the filler include inorganic particles.

The number-average particle size of the inorganic particles is preferably at least 10 nm but no greater than 100 nm, and more preferably at least 10 nm but no greater than 50 nm.

As a material for the inorganic particles, for example, at least one type selected from alumina, silica, zirconium oxide, barium titanate, strontium titanate, titanium oxide, silicon nitride, boron nitride, silicon carbide, chromium oxide, vanadium oxide, tin oxide, bismuth oxide, germanium oxide, aluminum borate, nickel oxide, molybdenum oxide, tungsten oxide, iron oxide, and cerium oxide is preferably contained as a main component.

With regard to the filler, one type thereof or two or more types thereof in combination may be used.

When a filler is used in the resin composition of the present invention, it is preferably, relative to 100 parts by weight of Component C, 1 to 100 parts by weight, more preferably 2 to 50 parts by weight, and yet more preferably 2 to 20 parts by weight.

(Relief Printing Starting Plate for Laser Engraving)

A first embodiment of the relief printing starting plate for laser engraving of the present invention comprises a relief-forming layer formed from the resin composition for laser engraving of the present invention.

A second embodiment of the relief printing starting plate for laser engraving of the present invention comprises a crosslinked relief-forming layer formed by crosslinking a relief-forming layer formed from the resin composition for laser engraving of the present invention.

In the present invention, the 'relief printing starting plate for laser engraving' means both or one of a plate having a crosslinkable relief-forming layer formed from the resin composition for laser engraving in a state before being crosslinked and a plate in a state in which it is cured by light and/or heat.

In the present invention, the 'relief-forming layer' means a layer in a state before being crosslinked, that is, a layer formed from the resin composition for laser engraving of the present invention, which may be dried as necessary.

In the present invention, the 'crosslinked relief-forming layer' means a layer formed by crosslinking the relief-forming layer. The crosslinking is preferably carried out by means of heat and/or light. Furthermore, the crosslinking is not particularly limited as long as it is a reaction by which the resin composition is cured, and it is a concept that includes a structure crosslinked due to reactions between Component A's, but it is preferable to form a crosslinked structure by a reaction between Component A and other Component. When polymerizable compound is used, the crossliking include a closslinking by polymerization.

The 'relief printing plate' is prepared by laser engraving a printing starting plate having a crosslinked relief-forming layer.

Moreover, in the present invention, the 'relief layer' means a layer of the relief printing plate formed by engraving using a laser, that is, the crosslinked relief-forming layer after laser engraving.

A relief printing starting plate for laser engraving of the present invention comprises a relief-forming layer formed from the resin composition for laser engraving of the present invention, which has the above-mentioned components. The (crosslinked) relief-forming layer is preferably provided above a support.

The (crosslinked) relief printing starting plate for laser engraving may further comprise, as necessary, an adhesive layer between the support and the (crosslinked) relief-forming layer and, above the relief-forming layer, a slip coat layer and a protection film.

<Relief-Forming Layer>

The relief-forming layer is a layer formed from the resin composition for laser engraving of the present invention and is a crosslinkable layer. With regard to the relief printing starting plate for laser engraving of the present invention, it is preferable for it to further contain (Component E) a polymerizable compound and (Component F) a polymerization initiator in addition to a crosslinked structure formed from Component A since one having a relief-forming layer to which further crosslinkable functionality is imparted is obtained.

As a mode in which a relief printing plate is prepared using the relief printing starting plate for laser engraving, a mode in which a relief printing plate is prepared by crosslinking a relief-forming layer to thus form a relief printing starting plate having a crosslinked relief-forming layer, and the crosslinked relief-forming layer (hard relief-forming layer) is then laser-engraved to thus form a relief layer is preferable. By crosslinking the relief-forming layer, it is possible to prevent abrasion of the relief layer during printing, and it is possible to obtain a relief printing plate having a relief layer with a sharp shape after laser engraving.

The relief-forming layer may be formed by molding the resin composition for laser engraving that has the above-mentioned components for a relief-forming layer into a sheet shape or a sleeve shape. The relief-forming layer is usually provided above a support, which is described later, but it may be formed directly on the surface of a member such as a cylinder of equipment for plate making or printing or may be placed and immobilized thereon, and a support is not always required.

A case in which the relief-forming layer is mainly formed in a sheet shape is explained as an Example below.

<Support>

A material used for the support of the relief printing starting plate for laser engraving is not particularly limited, but one having high dimensional stability is preferably used, and examples thereof include metals such as steel, stainless steel, or aluminum, plastic resins such as a polyester (e.g. PET (polyethylene terephthalate), PBT (polybutylene terephthalate), or PAN (polyacrylonitrile)) or polyvinyl chloride, synthetic rubbers such as styrene-butadiene rubber, and glass fiber-reinforced plastic resins (epoxy resin, phenolic resin, etc.). As the support, a PET film or a steel substrate is preferably used. The configuration of the support depends on whether the relief-forming layer is in a sheet shape or a sleeve shape.

<Adhesive Layer>

An adhesive layer may be provided between the relief-forming layer and the support for the purpose of strengthening the adhesion between the two layers. Examples of materials (adhesives) that can be used in the adhesive layer include those described in 'Handbook of Adhesives', Second Edition, Ed by I. Skeist, (1977).

<Protection Film, Slip Coat Layer>

For the purpose of preventing scratches or dents in the relief-forming layer surface or the crosslinked relief-forming layer surface, a protection film may be provided on the relief-forming layer surface or the crosslinked relief-forming layer surface. The thickness of the protection film is preferably 25 to 500 μm, and more preferably 50 to 200 μm. The protection film may employ, for example, a polyester-based film such as PET or a polyolefin-based film such as PE (polyethylene) or PP (polypropylene). The surface of the film may be made matte. The protection film is preferably peelable.

When the protection film is not peelable or conversely has poor adhesion to the relief-forming layer, a slip coat layer may be provided between the two layers. The material used in the slip coat layer preferably employs as a main component a resin that is soluble or dispersible in water and has little tackiness, such as polyvinyl alcohol, polyvinyl acetate, partially saponified polyvinyl alcohol, a hydroxyalkylcellulose, an alkylcellulose, or a polyamide resin.

(Process for Producing Relief Printing Starting Plate for Laser Engraving)

Formation of a relief-forming layer in the relief printing starting plate for laser engraving is not particularly limited, and examples thereof include a method in which the resin composition for laser engraving is prepared, solvent is removed as necessary from this resin composition for laser engraving, and it is melt-extruded onto a support. Alternatively, a method may be employed in which the resin composition for laser engraving is cast onto a support, and this is dried in an oven to thus remove solvent from the resin composition.

Among them, the process for making a relief printing plate for laser engraving of the present invention is preferably a production process comprising a layer formation step of forming a relief-forming layer from the resin composition for laser engraving of the present invention and a crosslinking step of crosslinking the relief-forming layer by means of heat and/or light to thus obtain a relief printing starting plate having a crosslinked relief-forming layer.

Subsequently, as necessary, a protection film may be laminated on the relief-forming layer. Laminating may be carried out by compression-bonding the protection film and the relief-forming layer by means of heated calendar rollers, etc. or putting a protection film into intimate contact with a relief-forming layer whose surface is impregnated with a small amount of solvent.

When a protection film is used, a method in which a relief-forming layer is first layered on a protection film and a support is then laminated may be employed.

When an adhesive layer is provided, it may be dealt with by use of a support coated with an adhesive layer. When a slip coat layer is provided, it may be dealt with by use of a protection film coated with a slip coat layer.

<Layer Formation Step>

The process for making the relief printing plate for laser engraving of the present invention preferably comprises a layer formation step of forming a relief-forming layer from the resin composition for laser engraving of the present invention.

Preferred examples of a method for forming a relief-forming layer include a method in which the resin composition for laser engraving of the present invention is prepared, solvent is removed as necessary from this resin composition for laser engraving, and it is then melt-extruded onto a support and a method in which the resin composition for laser engraving of the present invention is prepared, the resin composition for laser engraving of the present invention is cast onto a support, and this is dried in an oven to thus remove the solvent.

The resin composition for laser engraving may be produced by, for example, dissolving Component A to C, and as optional components Component D, Component G, a fregrance, and a plasticizer in an appropriate solvent, and then dissolving Component E and Component F. Since it is necessary to remove most of the solvent component in a stage of producing a relief printing starting plate, it is preferable to use as the solvent a volatile low-molecular-weight alcohol (e.g. methanol, ethanol, n-propanol, isopropanol, propylene glycol monomethyl ether), etc., and adjust the temperature, etc. to thus reduce as much as possible the total amount of solvent to be added.

The thickness of the (crosslinked) relief-forming layer in the relief printing starting plate for laser engraving before and after crosslinking is preferably at least 0.05 mm but no greater than 10 mm, more preferably at least 0.05 mm but no greater than 7 mm, and yet more preferably at least 0.05 mm but no greater than 3 mm.

<Crosslinking Step>

The process for producing a relief printing plate precursor for laser engraving of the present invention is preferably a production process comprising a crosslinking step of crosslinking the relief-forming layer by means of light and/or heat to thus obtain a relief printing plate precursor having a crosslinked relief-forming layer.

When the relief-forming layer comprises a photopolymerization initiator, the relief-forming layer may be crosslinked by irradiating the relief-forming layer with actinic radiation that triggers the photopolymerization initiator.

It is preferable to apply light to the entire surface of the relief-forming layer. Examples of the light (also called 'actinic radiation') include visible light, UV light, and an electron beam, but UV light is most preferably used. When the side where there is a substrate, such as a relief-forming layer support, for fixing the relief-forming layer, is defined as the reverse face, only the front face need be irradiated with light, but when the support is a transparent film through which actinic radiation passes, it is preferable to further irradiate the reverse face with light as well. When a protection film is present, irradiation from the front face may be carried out with the protection film as it is or after peeling off the protection film. Since there is a possibility of polymerization being inhibited in the presence of oxygen, irradiation with actinic radiation may be carried out after superimposing a polyvinyl chloride sheet on the relief-forming layer and evacuating.

When the relief-forming layer comprises a thermopolymerization initiator (it being possible for the above-mentioned photopolymerization initiator to function also as a thermopolymerization initiator), the relief-forming layer may be crosslinked by heating the relief printing plate precursor for laser engraving (step of crosslinking by means of heat). As heating means, there can be cited a method in which a printing plate precursor is heated in a hot air oven or a far-infrared oven for a predetermined period of time and a method in which it is put into contact with a heated roller for a predetermined period of time.

As a method for crosslinking the relief-forming layer, from the viewpoint of the relief-forming layer being uniformly curable (crosslinkable) from the surface into the interior, crosslinking by heat is preferable.

Due to the relief-forming layer being crosslinked, firstly, a relief formed after laser engraving becomes sharp and, secondly, tackiness of engraving residue formed when laser engraving is suppressed. If an uncrosslinked relief-forming layer is laser-engraved, residual heat transmitted to an area around a laser-irradiated part easily causes melting or deformation of a part that is not targeted, and a sharp relief layer cannot be obtained in some cases. Furthermore, in terms of the general properties of a material, the lower the molecular weight, the more easily it becomes a liquid rather than a solid, that is, there is a tendency for tackiness to be stronger. Engraving residue formed when engraving a relief-forming layer tends to have higher tackiness the more that low-molecular-weight materials are used. Since a polymerizable compound, which is a low-molecular-weight material, becomes a polymer by crosslinking, the tackiness of the engraving residue formed tends to decrease.

When the crosslinking step is a step of carrying out crosslinking by light, although equipment for applying actinic radiation is relatively expensive, since a printing plate precursor does not reach a high temperature, there are hardly any restrictions on starting materials for the printing plate precursor.

When the crosslinking step is a step of carrying out crosslinking by heat, although there is the advantage that particularly expensive equipment is not needed, since a printing plate precursor reaches a high temperature, it is necessary to carefully select the starting materials used while taking into consideration the possibility that a thermoplastic polymer, which becomes soft at high temperature, will deform during heating, etc.

During thermal crosslinking, it is preferable to add a thermopolymerization initiator. As the thermopolymerization initiator, a commercial thermopolymerization initiator for free radical polymerization may be used. Examples of such a thermopolymerization initiator include an appropriate peroxide, hydroperoxide, and azo group-containing compound. A representative vulcanizing agent may also be used for crosslinking. Thermal crosslinking may also be carried out by adding a heat-curable resin such as for example an epoxy resin as a crosslinking component to a layer.

(Relief Printing Plate and Process for Making Same)

The process for making a relief printing plate of the present invention comprises a layer formation step of forming a relief-forming layer from the resin composition for laser engraving of the present invention, a crosslinking step of crosslinking the relief-forming layer by means of heat and/or light to thus obtain a relief printing starting plate having a crosslinked relief-forming layer, and an engraving step of laser-engraving the relief printing starting plate having the crosslinked relief-forming layer.

The relief printing plate of the present invention is a relief printing plate having a relief layer obtained by crosslinking and laser-engraving a layer formed from the resin composition for laser engraving of the present invention, and is preferably a relief printing plate made by the process for making a relief printing plate of the present invention.

The layer formation step and the crosslinking step in the process for making a relief printing plate of the present invention mean the same as the layer formation step and the crosslinking step in the above-mentioned process for producing a relief printing starting plate for laser engraving, and preferred ranges are also the same.

<Engraving Step>

The process for making a relief printing plate of the present invention preferably comprises an engraving step of laser-engraving the relief printing starting plate having a crosslinked relief-forming layer.

The engraving step is a step of laser-engraving a crosslinked relief-forming layer that has been crosslinked in the crosslinking step to thus form a relief layer. Specifically, it is preferable to engrave a crosslinked relief-forming layer that has been crosslinked by irradiation with laser light according to a desired image, thus forming a relief layer. Furthermore, a step in which a crosslinked relief-forming layer is subjected to scanning irradiation by controlling a laser head using a computer in accordance with digital data of a desired image can preferably be cited.

This engraving step preferably employs an infrared laser. When irradiated with an infrared laser, molecules in the crosslinked relief-forming layer undergo molecular vibration, thus generating heat. When a high power laser such as a carbon dioxide laser or a YAG laser is used as the infrared laser, a large quantity of heat is generated in the laser-irradiated area, and molecules in the crosslinked relief-forming layer undergo molecular scission or ionization, thus being selectively removed, that is, engraved. The advantage of laser engraving is that, since the depth of engraving can be set freely, it is possible to control the structure three-dimensionally. For example, for an area where fine halftone dots are printed, carrying out engraving shallowly or with a shoulder prevents the relief from collapsing due to printing pressure, and for a groove area where a fine outline character is printed, carrying out engraving deeply makes it difficult for ink the groove to be blocked with ink, thus enabling breakup of an outline character to be suppressed.

In particular, when engraving is carried out using an infrared laser that corresponds to the absorption wavelength of the photothermal conversion agent, it becomes possible to selectively remove the crosslinked relief-forming layer at higher sensitivity, thus giving a relief layer having a sharp image.

As the infrared laser used in the engraving step, from the viewpoint of productivity, cost, etc., a carbon dioxide laser (a $CO_2$ laser) or a semiconductor laser is preferable. In particular, a fiber-coupled semiconductor infrared laser (FC-LD) is preferably used. In general, compared with a $CO_2$ laser, a semiconductor laser has higher efficiency laser oscillation, is less expensive, and can be made smaller. Furthermore, it is easy to form an array due to the small size. Moreover, the shape of the beam can be controlled by treatment of the fiber.

With regard to the semiconductor laser, one having a wavelength of 700 to 1,300 nm is preferable, one having a wavelength of 800 to 1,200 nm is more preferable, one having a wavelength of 860 to 1,200 nm is further preferable, and one having a wavelength of 900 to 1,100 nm is particularly preferable.

Furthermore, the fiber-coupled semiconductor laser can output laser light efficiently by being equipped with optical fiber, and this is effective in the engraving step in the present invention. Moreover, the shape of the beam can be controlled by treatment of the fiber. For example, the beam profile may be a top hat shape, and energy can be applied stably to the plate face. Details of semiconductor lasers are described in 'Laser Handbook $2^{nd}$ Edition' The Laser Society of Japan, and 'Applied Laser Technology' The Institute of Electronics and Communication Engineers, etc.

Moreover, as plate making equipment comprising a fiber-coupled semiconductor laser that can be used suitably in the process for making a relief printing plate employing the relief printing starting plate of the present invention, those described in detail in JP-A-2009-172658 and JP-A-2009-214334 can be cited.

The process for making a relief printing plate of the present invention may as necessary further comprise, subsequent to the engraving step, a rinsing step, a drying step, and/or a post-crosslinking step, which are shown below.

Rinsing step: a step of rinsing the engraved surface by rinsing the engraved relief layer surface with water or a liquid containing water as a main component.

Drying step: a step of drying the engraved relief layer.

Post-crosslinking step: a step of further crosslinking the relief layer by applying energy to the engraved relief layer.

After the above-mentioned step, since engraving residue is attached to the engraved surface, a rinsing step of washing off engraving residue by rinsing the engraved surface with water or a liquid containing water as a main component may be added. Examples of rinsing means include a method in which washing is carried out with tap water, a method in which high pressure water is spray-jetted, and a method in which the engraved surface is brushed in the presence of mainly water using a batch or conveyor brush type washout machine known as a photosensitive resin relief printing starting plate, and when slime due to engraving residue cannot be eliminated, a rinsing liquid to which a soap or a surfactant is added may be used.

When the rinsing step of rinsing the engraved surface is carried out, it is preferable to add a drying step of drying an engraved relief-forming layer so as to evaporate rinsing liquid.

Furthermore, as necessary, a post-crosslinking step for further crosslinking the relief-forming layer may be added. By carrying out a post-crosslinking step, which is an additional crosslinking step, it is possible to further strengthen the relief formed by engraving.

The pH of the rinsing liquid that can be used in the present invention is preferably at least 9, more preferably at least 10, and yet more preferably at least 11. The pH of the rinsing liquid is preferably no greater than 14, more preferably no greater than 13.5, yet more preferably no greater than 13.2, particularly preferably no greater than 13, and most preferably no greater than 12.5. When in the above-mentioned range, handling is easy.

In order to set the pH of the rinsing liquid in the above-mentioned range, the pH may be adjusted using an acid and/or a base as appropriate, and the acid or base used is not particularly limited.

The rinsing liquid that can be used in the present invention preferably comprises water as a main component.

The rinsing liquid may contain as a solvent other than water a water-miscible solvent such as an alcohol, acetone, or tetrahydrofuran.

The rinsing liquid preferably comprises a surfactant.

From the viewpoint of removability of engraving residue and little influence on a relief printing plate, preferred examples of the surfactant that can be used in the present invention include betaine compounds (amphoteric surfactants) such as a carboxybetaine compound, a sulfobetaine compound, a phosphobetaine compound, an amine oxide compound, and a phosphine oxide compound.

Furthermore, examples of the surfactant also include known anionic surfactants, cationic surfactants, amphoteric surfactants, and nonionic surfactants. Moreover, a fluorine-based or silicone-based nonionic surfactant may also be used in the same manner.

With regard to the surfactant, one type may be used on its own or two or more types may be used in combination.

It is not necessary to particularly limit the amount of surfactant used, but it is preferably 0.01 to 20 weight % relative to the total weight of the rinsing liquid, and more preferably 0.05 to 10 weight %.

The relief printing plate of the present invention having a relief layer on the surface of any substrate such as a support etc. may be produced as described above.

From the viewpoint of satisfying suitability for various aspects of printing, such as abrasion resistance and ink transfer properties, the thickness of the relief layer of the relief printing plate is preferably at least 0.05 mm but no greater than 10 mm, more preferably at least 0.05 mm but no greater than 7 mm, and yet more preferably at least 0.05 mm but no greater than 3 mm.

Furthermore, the Shore A hardness of the relief layer of the relief printing plate is preferably at least 50° but no greater than 90°. When the Shore A hardness of the relief layer is at least 50°, even if fine halftone dots formed by engraving receive a strong printing pressure from a letterpress printer, they do not collapse and close up, and normal printing can be carried out. Furthermore, when the Shore A hardness of the relief layer is no greater than 90°, even for flexographic printing with kiss touch printing pressure it is possible to prevent patchy printing in a solid printed part.

The Shore A hardness in the present specification is a value measured by a durometer (a spring type rubber hardness meter) that presses an indenter (called a pressing needle or indenter) into the surface of a measurement target so as to deform it, measures the amount of deformation (indentation depth), and converts it into a numerical value.

The relief printing plate of the present invention is particularly suitable for printing by a flexographic printer using an aqueous ink, but printing is also possible when it is carried out by a relief printer using any of aqueous, oil-based, and UV inks, and printing is also possible when it is carried out by a flexographic printer using a UV ink. The relief printing plate of the present invention has excellent rinsing properties, there is no engraving residue, since a relief layer obtained has excellent elasticity aqueous ink transfer properties and printing durability are excellent, and printing can be carried out for a long period of time without plastic deformation of the relief layer or degradation of printing durability.

In accordance with the present invention, there can be provided a resin composition for laser engraving that can give a relief printing plate having excellent ink transfer properties and that has excellent rinsing properties for engraving residue generated when laser-engraving a relief printing plate precursor and excellent engraving sensitivity in laser engraving, a relief printing plate precursor employing the resin composition for laser engraving, a process for making a relief printing plate employing same, and a relief printing plate obtained thereby.

EXAMPLES

The present invention is explained in further detail below by reference to Examples, but the present invention should not be construed as being limited to these Examples.

The weight-average molecular weight (Mw) of a polymer in the Examples is a value measured by a GPC method unless otherwise specified. Furthermore, 'parts' in the description below means 'parts by weight' unless otherwise specified.

Examples 1 to 29 and Comparative Examples 1 to 5

1. Preparation of Resin Composition for Laser Engraving

Resin compositions for laser engraving were obtained by mixing the components shown in Table 1 in the amounts shown below by the operations shown below.

| | |
|---|---|
| Component A | 20 parts by weight |
| Component B | 5 parts by weight |
| Component C | 40 parts by weight |
| Component D | 1 part by weight |
| Component E | 10 parts by weight |
| Component F | 1 part by weight |
| Component G | 5 parts by weight |
| Plasticizer: tributyl citrate (Wako Pure Chemical Industries, Ltd.) | 18 parts by weight |
| Other additive | 5 parts by weight |

(When another additive was added, the amount of Component C added was 35 parts by weight.)

A three-necked flask equipped with a stirring blade and a condenser was charged with Component C and, as a solvent, 47 parts of propylene glycol monomethyl ether acetate, and heated at 70° C. for 120 minutes while stirring to thus dissolve Component C. Subsequently, the solution was set at 40° C., Component E, Component F, Component G, and other additive were further added, and stirring was carried out for 30 minutes. Subsequently, Component A, Component B, and Component D were added, and stirring was carried out at 40° C. for 10 minutes. As a result of the above operations, flowable coating solution for a relief-forming layer (resin composition for laser engraving) was obtained.

2. Preparation of Relief Printing Plate Precursor for Laser Engraving

A spacer (frame) having a predetermined thickness was placed on a PET substrate, and each coating solution for a relief-forming layer obtained above was cast gently so that it did not overflow from the spacer (frame) and dried in an oven at 70° C. for 3 hours to provide a relief-forming layer having a thickness of about 1 mm, thus preparing the relief printing plate precursor for laser engraving.

3. Making Relief Printing Plate

The relief-forming layer of each precursor obtained was heated at 80° C. for 3 hours and further at 100° C. for 3 hours, thus thermally crosslinking the relief-forming layer.

The relief-forming layer after crosslinking was engraved using the two types of laser below.

As a carbon dioxide laser engraving machine, for engraving by irradiation with a laser, an ML-9100 series high quality $CO_2$ laser marker (Keyence) was used. After a protection film was peeled off from the printing plate precursor for laser engraving, a 1 cm square solid printed part was raster-engraved using the carbon dioxide laser engraving machine under conditions of an output of 12 W, a head speed of 200 mm/sec, and a pitch setting of 2,400 DPI.

As a semiconductor laser engraving machine, laser recording equipment provided with an SDL-6390 fiber-coupled semiconductor laser (FC-LD) (JDSU, wavelength 915 nm) with a maximum power of 8.0 W was used. A 1 cm square solid printed part was raster-engraved using the semiconductor laser engraving machine under conditions of a laser output of 7.5 W, a head speed of 409 mm/sec, and a pitch setting of 2,400 DPI.

The thickness of the relief layer of each relief printing plate was about 1 mm.

Furthermore, when the Shore A hardness of the relief layer was measured by the above-mentioned measurement method, it was found to be 75°. Measurement of Shore A hardness was carried out in the same manner for the Examples and Comparative Examples described below.

4. Evaluation of Relief Printing Plate

The performance of a relief printing plate was evaluated for the items below. The results are summarized in Table 2.

(4-1) Ink Transfer Properties

Each relief printing plate that had been obtained was set in a printer (ITM-4 type, Iyo Kikai Seisakujo Co., Ltd.), printing was continued using the aqueous ink Aqua SPZ16 rouge (Toyo Ink Mfg. Co., Ltd.) as an ink without dilution and Full Color Form M 70 (Nippon Paper Industries Co., Ltd., thickness 100 µm) as printing paper, and the degree of ink attachment of a solid printed part on the printed material at 500 m and 1,000 m from the start of printing was compared by visual inspection.

One that was uniform without unevenness in density was evaluated as Good, one with unevenness was evaluated as Poor, a degree midway between Good and Poor was evaluated as Fair, and one with only slight unevenness in density was evaluated as Good/Fair.

(4-2) Rinsing Properties

A laser engraved plate was immersed in water and an engraved part was rubbed with a toothbrush (Clinica Toothbrush Flat, Lion Corporation) 10 times. Subsequently, the presence/absence of residue on the surface of the relief layer was checked by an optical microscope. When there was no residue, the evaluation was Excellent, when there was hardly any residue the evaluation was Good, when there was a little residue the evaluation was Good/Fair, when there was some residue remaining the evaluation was Fair, and when the residue could not be removed the evaluation was Poor.

(4-3) Engraving Depth

The 'engraving depth' of a relief layer obtained by laser engraving a relief-forming layer of each relief printing plate precursor obtained was measured as follows. The 'engraving depth' referred to here means the difference between an engraved position (height) and an unengraved position (height) when a cross-section of the relief layer was examined. The 'engraving depth' in the present Examples was measured by examining a cross-section of a relief layer using a VK9510 ultradepth color 3D profile measurement microscope (Keyence). A large engraving depth means a high engraving sensitivity. The results are given in Table 2 for each of the types of laser used for engraving.

TABLE 1

|  | Component A | Component B | Component C | Component D | Component E | Component F | Component G | Other additive |
|---|---|---|---|---|---|---|---|---|
| Ex. 1 | S-1 | (BP)AlOiPr | C-1 | None | None | None | None | None |
| Ex. 2 | S-1 | (BP)AlOiPr | C-1 | DBU | None | None | None | None |
| Ex. 3 | S-1 | (BP)AlOiPr | C-1 | DBU | DPHA | F-1 | None | None |
| Ex. 4 | S-1 | (BP)AlOiPr | C-1 | DBU | DPHA | F-1 | G-1 | None |
| Ex. 5 | S-2 | (BP)AlOiPr | C-1 | DBU | DPHA | F-1 | G-1 | None |
| Ex. 6 | S-3 | (BP)AlOiPr | C-1 | DBU | DPHA | F-1 | G-1 | None |
| Ex. 7 | S-4 | (BP)AlOiPr | C-1 | DBU | DPHA | F-1 | G-1 | None |
| Ex. 8 | S-5 | (BP)AlOiPr | C-1 | DBU | DPHA | F-1 | G-1 | None |
| Ex. 9 | S-6 | (BP)AlOiPr | C-1 | DBU | DPHA | F-1 | G-1 | None |
| Ex. 10 | S-7 | (BP)AlOiPr | C-1 | DBU | DPHA | F-1 | G-1 | None |
| Ex. 11 | S-8 | (BP)AlOiPr | C-1 | DBU | DPHA | F-1 | G-1 | None |
| Ex. 12 | S-9 | (BP)AlOiPr | C-1 | DBU | DPHA | F-1 | G-1 | None |
| Ex. 13 | S-10 | (BP)AlOiPr | C-1 | DBU | DPHA | F-1 | G-1 | None |
| Ex. 14 | S-1 | Zinc glutarate | C-1 | DBU | DPHA | F-1 | G-1 | None |
| Ex. 15 | S-1 | (BDIEt) ZnOAc | C-1 | DBU | DPHA | F-1 | G-1 | None |
| Ex. 16 | S-1 | (BDIiPr) ZnOAc | C-1 | DBU | DPHA | F-1 | G-1 | None |
| Ex. 17 | S-1 | PPNCl | C-1 | DBU | DPHA | F-1 | G-1 | None |
| Ex. 18 | S-1 | (salcy) CoOBzF5 | C-1 | DBU | DPHA | F-1 | G-1 | None |
| Ex. 19 | S-1 | (BP)AlOiPr | C-2 | DBU | DPHA | F-1 | G-1 | None |
| Ex. 20 | S-1 | (BP)AlOiPr | C-3 | DBU | DPHA | F-1 | G-1 | None |
| Ex. 21 | S-1 | (BP)AlOiPr | C-1 | Phosphoric acid | DPHA | F-1 | G-1 | None |
| Ex. 22 | S-1 | (BP)AlOiPr | C-1 | Phosphoric acid | TMPTA | F-1 | G-1 | None |
| Ex. 23 | S-1 | (BP)AlOiPr | C-1 | Phosphoric acid | DCP | F-1 | G-1 | None |
| Ex. 24 | S-1 | (BP)AlOiPr | C-1 | Phosphoric acid | A-BPE-10 | F-1 | G-1 | None |
| Ex. 25 | S-1 | (BP)AlOiPr | C-1 | Phosphoric acid | A-BPE-10 | F-2 | G-1 | None |
| Ex. 26 | S-1 | (BP)AlOiPr | C-1 | DBU | A-BPE-10 | F-2 | G-1 | None |
| Ex. 27 | S-1 | (BP)AlOiPr | C-1 | DBU | A-BPE-10 | F-1 | G-1 | H-1 |
| Ex. 28 | S-1 | (BP)AlOiPr | C-1 | DBU | A-BPE-10 | F-1 | G-1 | H-2 |
| Ex. 29 | S-1 | (BP)AlOiPr | C-1 | DBU | A-BPE-10 | F-1 | G-1 | H-3 |
| Comp. Ex. 1 | None | (BP)AlOiPr | C-1 | DBU | DPHA | F-1 | G-1 | None |
| Comp. Ex. 2 | S-1 | None | C-1 | DBU | DPHA | F-1 | G-1 | None |
| Comp. Ex. 3 | S-1 | (BP)AlOiPr | C-4 | DBU | DPHA | F-1 | G-1 | None |
| Comp. Ex. 4 | S-1 | (BP)AlOiPr | C-5 | DBU | DPHA | F-1 | G-1 | None |
| Comp. Ex. 5 | S-1 | (BP)AlOiPr | C-6 | DBU | DPHA | F-1 | G-1 | None |

TABLE 2

|  |  | Ink | Engraving depth (µm) | |
|---|---|---|---|---|
|  | Rinsing properties | transfer properties | $CO_2$ laser | IR laser |
| Ex. 1 | Good | Fair | 270 | — |
| Ex. 2 | Good | Fair | 280 | — |
| Ex. 3 | Good | Good/Fair | 310 | — |
| Ex. 4 | Good | Good | 330 | 396 |
| Ex. 5 | Good | Good | 320 | 384 |
| Ex. 6 | Good | Good | 310 | 372 |
| Ex. 7 | Good | Good | 310 | 372 |
| Ex. 8 | Good | Good | 315 | 378 |
| Ex. 9 | Good | Good | 314 | 377 |
| Ex. 10 | Good | Good | 320 | 384 |
| Ex. 11 | Good | Good | 321 | 385 |
| Ex. 12 | Excellent | Good | 310 | 372 |
| Ex. 13 | Excellent | Good | 310 | 372 |
| Ex. 14 | Good | Good | 320 | 384 |
| Ex. 15 | Good | Good | 322 | 386 |
| Ex. 16 | Good | Good | 325 | 390 |
| Ex. 17 | Good | Good | 321 | 385 |
| Ex. 18 | Good | Good | 325 | 390 |
| Ex. 19 | Good | Good | 321 | 385 |
| Ex. 20 | Good | Good | 300 | 360 |
| Ex. 21 | Good | Good | 320 | 384 |
| Ex. 22 | Good | Good | 320 | 384 |

TABLE 2-continued

| | Rinsing properties | Ink transfer properties | Engraving depth (μm) CO$_2$ laser | IR laser |
|---|---|---|---|---|
| Ex. 23 | Good | Good | 315 | 378 |
| Ex. 24 | Good | Good | 322 | 386 |
| Ex. 25 | Good | Good | 324 | 389 |
| Ex. 26 | Good | Good | 322 | 386 |
| Ex. 27 | Good | Good | 335 | 402 |
| Ex. 28 | Good | Good | 336 | 403 |
| Ex. 29 | Good | Good | 340 | 408 |
| Comp. Ex. 1 | Poor | Poor | 340 | 408 |
| Comp. Ex. 2 | Good/Fair | Fair | 210 | 252 |
| Comp. Ex. 3 | Fair | Good | 190 | 228 |
| Comp. Ex. 4 | Good/Fair | Poor | 230 | 276 |
| Comp. Ex. 5 | Fair | Fair | 200 | 240 |

Details of components used in Examples and Comparative Examples are as follows.

<Component A: Compound Having Hydrolyzable Silyl Group and/or Silanol Group>

Et in the chemical formulae below is an ethyl group, and Me is a methyl group.

S-1
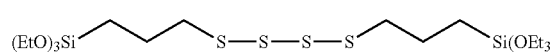

S-2
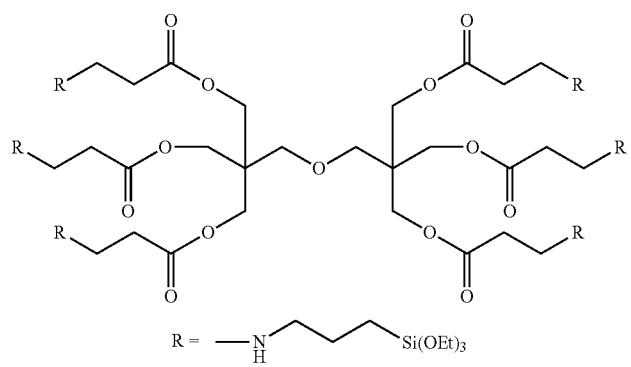

S-3
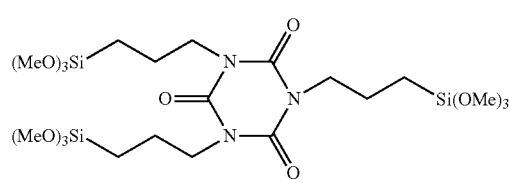

S-4
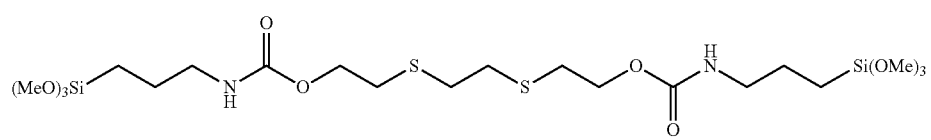

S-5
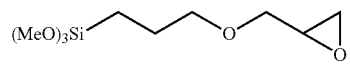

S-6

S-7
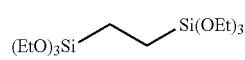

S-8
A mixture of
and
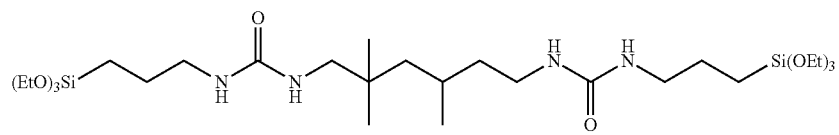

-continued

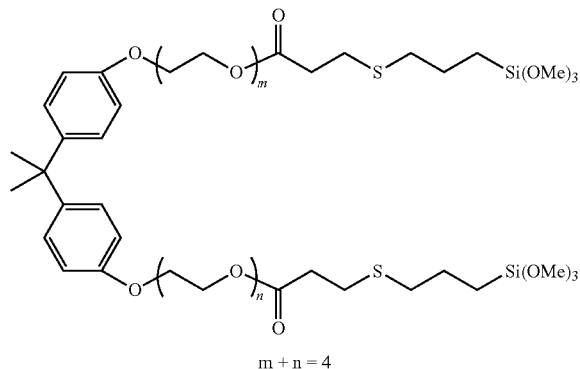

S-9 m + n = 4

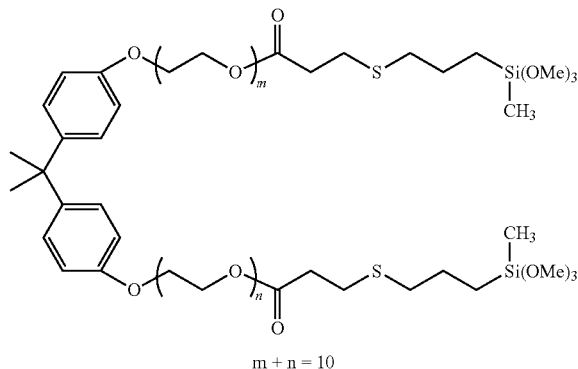

S-10 m + n = 10

<Component B: Depolymerization Catalyst and/or Depolymerization Catalyst Precursor>

Abbreviations shown in Table 1 mean the same as above.

<Component C: Depolymerizable Binder Polymer>

C-1: poly(propylene carbonate) (Novomer (Ithaca, N.Y.))

C-2: poly(2-ethoxyethyl 2-cyanoacrylate) (Mw=26,000)

C-3: polylactic acid (Aldrich)

C-4: styrene-butadiene rubber (TR2000, JSR)

C-5: polyvinylbutyral (S-LEC BL-2, Sekisui Chemical Co., Ltd.)

C-6: styrene-butadiene-styrene block copolymer (KRATON G1780, Kraton (Houston, Tex.))

<Component D: Catalyst for Promoting Hydrolysis Reaction and/or Condensation Reaction of Component A>

DBU (1,8-diazabicyclo[5.4.0]undec-7-ene (Wako Pure Chemical Industries, Ltd.))

Phosphoric acid (Wako Pure Chemical Industries, Ltd.)

<Component E: Polymerizable Compound>

DPHA: dipentaerythritol hexaacrylate (Daicel-Cytec Company Ltd.)

TMPTA: trimethylolpropane triacrylate (Daicel-Cytec Company Ltd.)

DCP: tricyclodecanedimethanol dimethacrylate (Shin-Nakamura Chemical Co., Ltd.)

A-BPE-10: ethoxylated bisphenol A diacrylate (bisphenol A ethylene oxide 10 mol adduct diacrylate, Shin-Nakamura Chemical Co., Ltd.)

<Component F: Polymerization Initiator>

F-1: Perbutyl Z (t-butylperoxybenzoate, NOF Corporation)

F-2: V-601 (dimethyl 2,2'-azobis(2-methylpropionate), Wako Pure Chemical Industries, Ltd.)

<Component G: Photothermal Conversion Agent>

G-1: Ketjen Black EC600JD (carbon black, Lion Corporation)

<Other Additive>

H-1: silica particles (AEROSIL 200CF, Nippon Aerosil Co., Ltd.)

H-2: silica particles (Sylosphere C-1504, Fuji Silysia Chemical Ltd.)

H-3: thermoplastic resin particles containing liquefied gas in interior (EXPANCEL, Akzo Noble)

Synthetic Examples of S-8 and S-9 among the above-mentioned Components A are shown below. S-3 is X-12-965 manufactured by Shin-Etsu Chemical Co., Ltd.

Synthetic Example 1

Synthesis of S-8

A three-necked flask equipped with a stirring blade and a condenser was charged with 20.34 parts of 3-aminopropyl-triethoxysilane (Tokyo Chemical Industry Co., Ltd.) and 7.50 parts of 2-butanone (Wako Pure Chemical Industries, Ltd.), and 9.66 parts of trimethylhexamethylene diisocyanate (mixture of 2,2,4-substituted and 2,4,4-substituted, Tokyo Chemical Industry Co., Ltd.) was added thereto dropwise at room temperature (25° C., the same applies below) over 30 min. After the dropwise addition, stirring was carried out at room temperature for 1 hour, and subsequently 2-butanone was removed under reduced pressure, thus giving 29.54 parts of S-8 as a mixture of two types of compounds. The structures of the two types of compounds contained in the S-8 thus obtained were identified using $^1$H NMR.

Synthetic Example 2-1

Synthesis of S-9

A three-necked flask equipped with a stirring blade and a condenser was charged with 15.54 parts of NK Ester A-BPE-4 (Shin-Nakamura Chemical Co., Ltd.) and 0.06 parts of 1,8-diazabicyclo[5.4.0]undec-7-ene (Wako Pure Chemical Industries, Ltd.), and 14.46 parts of KBE-803 (Shin-Etsu Chemical Co., Ltd.) was added thereto dropwise at room temperature over 30 min. After the dropwise addition, stirring was carried out at room temperature for 2 hours, thus giving S-9 (29.42 parts). The structure of the S-9 thus obtained was identified using $^1$H NMR.

S-9 can be synthesized by a method other than the above-mentioned method. Other Synthetic Examples are explained below.

Synthetic Example 2-2

Synthesis of S-9

A three-necked flask equipped with a stirring blade and a condenser was charged with 15.54 parts of NK Ester A-BPE-4 (Shin-Nakamura Chemical Co., Ltd.) and 0.06 parts of EPOMIN SP-006 (Nippon Shokubai Co., Ltd.), and 14.46 parts of KBE-803 (Shin-Etsu Chemical Co., Ltd.) was added thereto dropwise at room temperature over 30 min. After the dropwise addition, stirring was carried out at room temperature for 2 hours, thus giving S-9 (29.11 parts). The structure of the S-9 thus obtained was identified using $^1$H NMR.

Synthetic Example 2-3

Synthesis of S-9

A three-necked flask equipped with a stirring blade and a condenser was charged with 15.54 parts of NK Ester A-BPE-4 (Shin-Nakamura Chemical Co., Ltd.), 14.46 parts of KBE-803 (Shin-Etsu Chemical Co., Ltd.), 30.00 parts of 2-butanone (Wako Pure Chemical Industries, Ltd.), and 0.10 parts of V-65 (2,2'-azobis(2,4-dimethylvaleronitrile), Wako Pure Chemical Industries, Ltd.), the temperature was increased to 70° C., and stirring was carried out for 4 hours. After the reaction, 2-butanone was removed under reduced pressure, thus giving S-9 (29.38 parts). The structure of the S-9 thus obtained was identified using $^1$H NMR.

NK Ester A-BPE-4 (Shin-Nakamura Chemical Co., Ltd.), KBE-803 (Shin-Etsu Chemical Co., Ltd.), and Epomin SP-006 (Nippon Shokubai Co., Ltd.) used in the Synthetic Examples above are the compounds shown below. In the description below, Et denotes a ethyl group.

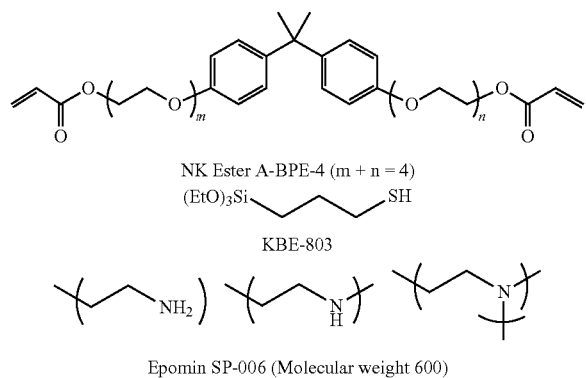

NK Ester A-BPE-4 (m + n = 4)

KBE-803

Epomin SP-006 (Molecular weight 600)

What is claimed is:

1. A resin composition for laser engraving, comprising:
(Component A) a compound having a hydrolyzable silyl group and/or a silanol group;
(Component B) a depolymerization catalyst and/or a depolymerization catalyst precursor;
(Component C) a depolymerizable binder polymer, and
(Component E) a polymerizable compound,
wherein Component C is a polymer having at least a monomer unit represented by Formula (C-1) or a constituent unit represented by Formulae (C-2) to (C-4) below,

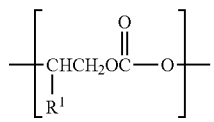
(C-1)

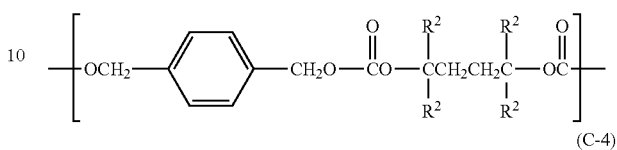
(C-2)

(C-3)

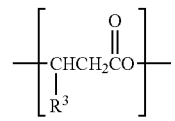
(C-4)

wherein R denotes an alkyl group having 1 to 20 carbons or an alkoxyalkyl group having 1 to 20 carbons, $R^1$ denotes an alkyl group having 1 to 30 carbons, the $R^2$s independently denote an alkyl group having 1 to 10 carbons, and $R^3$ denotes an alkyl group having 1 to 30 carbons.

2. The resin composition for laser engraving according to claim 1, wherein Component A is a compound having two or more hydrolyzable silyl groups.

3. The resin composition for laser engraving according to claim 1, wherein the hydrolyzable silyl group is a hydrolyzable silyl group in which at least one of an alkoxy group and a halogen atom is directly bonded to the Si atom.

4. The resin composition for laser engraving according to claim 1, wherein Component A is a compound further having in the molecule at least one type of atom or bond selected from the group consisting of a sulfur atom, an ester bond, a urethane bond, and an ether bond.

5. The resin composition for laser engraving according to claim 1, wherein Component C is a polycyanoacrylate that forms a cyanoacrylate as a main component of a decomposition product when thermally decomposed or a polycarbonate that forms a cyclic carbonate as a main component of a decomposition product when thermally decomposed.

6. The resin composition for laser engraving according to claim 1, wherein the depolymerization catalyst is a Lewis acid or an organic metal catalyst.

7. The resin composition for laser engraving according to claim 1, wherein the depolymerization catalyst precursor is an acid generator or a base generator.

8. The resin composition for laser engraving according to claim 1, wherein Component B is a Group 3 to 15 metal Lewis acid compound, or organic cationic compound.

9. The resin composition for laser engraving according to claim 1, wherein the resin composition further comprises (Component D) a catalyst for promoting a hydrolysis reaction and/or condensation reaction of Component A.

10. The resin composition for laser engraving according to claim 1, wherein the resin composition further comprises (Component F) a polymerization initiator.

11. The resin composition for laser engraving according to claim 1, wherein the resin composition further comprises (Component G) a photothermal conversion agent that can absorb light having a wavelength of 700 to 1,300 nm.

12. A relief printing plate precursor for laser engraving, comprising a crosslinked relief-forming layer comprising the resin composition for laser engraving according to claim 1.

13. A relief printing plate precursor for laser engraving, comprising a crosslinked relief-forming layer formed by crosslinking by means of light and/or heat a relief-forming layer comprising the resin composition for laser engraving according to claim 1.

14. A process for producing a relief printing plate precursor for laser engraving, comprising:
- a layer formation step of forming a relief-forming layer from the resin composition for laser engraving according to claim 1; and
- a crosslinking step of crosslinking the relief-forming layer by light and/or heat to thus obtain a relief printing plate precursor having a crosslinked relief-forming layer.

15. The process for producing a relief printing plate precursor for laser engraving according to claim 14, wherein the crosslinking step is a step of crosslinking the resin composition for laser engraving layer by means of heat to thus obtain a relief printing plate precursor having a relief-forming layer.

16. A process for making a relief printing plate, comprising:
- a layer formation step of forming a relief-forming layer from the resin composition for laser engraving according to claim 1;
- a crosslinking step of crosslinking the relief-forming layer by light and/or heat to thus obtain a relief printing plate precursor having a crosslinked relief-forming layer; and
- an engraving step of laser-engraving the relief printing plate precursor having a crosslinked relief-forming layer to thus form a relief layer.

17. The resin composition for laser engraving according to claim 1, wherein Component B is a compound selected from the group consisting of an aluminum compound, a zinc compound, a tin compound, a bis(phosphine)iminium compound, and an organic metal catalyst.

18. The resin composition for laser engraving according to claim 1, wherein Component B is a compound selected from the group consisting of aluminum chloride, zinc chloride, tin chloride, and the compounds shown below:

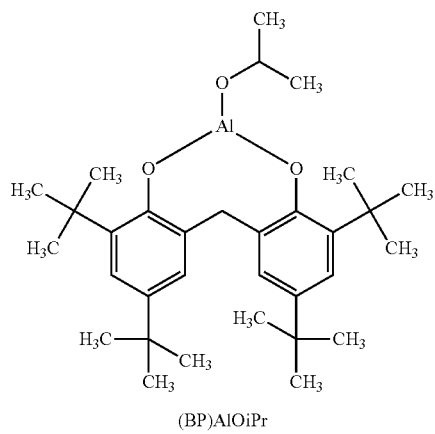
(BP)AlOiPr

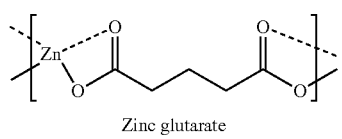
Zinc glutarate

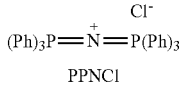
PPNCl

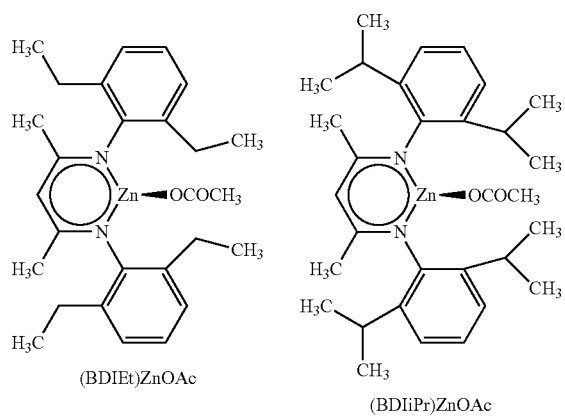
(BDIEt)ZnOAc  (BDIiPr)ZnOAc

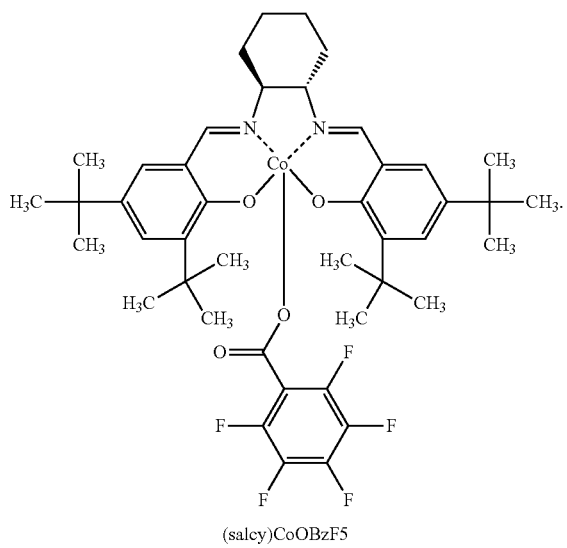
(salcy)CoOBzF5

19. The resin composition for laser engraving according to claim 1, wherein Component B is a compound selected from the group consisting of the compounds shown below:

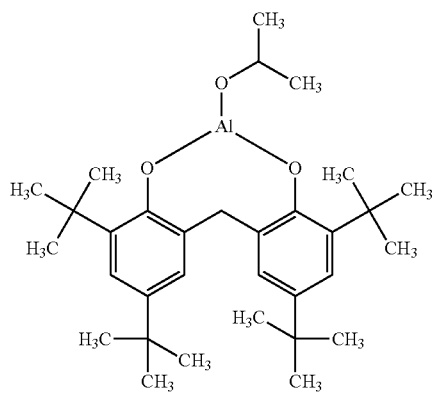
(BP)AlOiPr

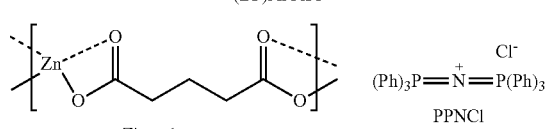

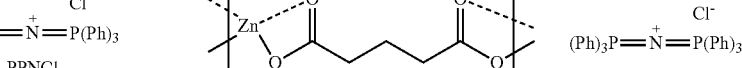
Zinc glutarate    PPNCl

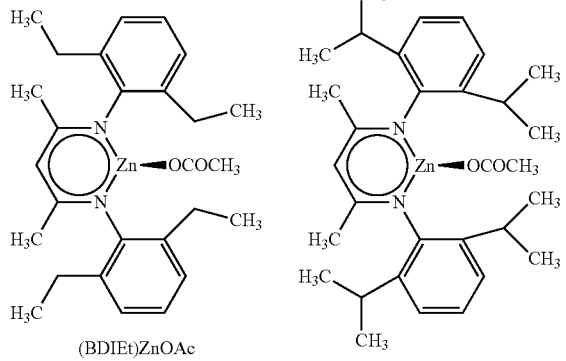

(BDIEt)ZnOAc  (BDIiPr)ZnOAc

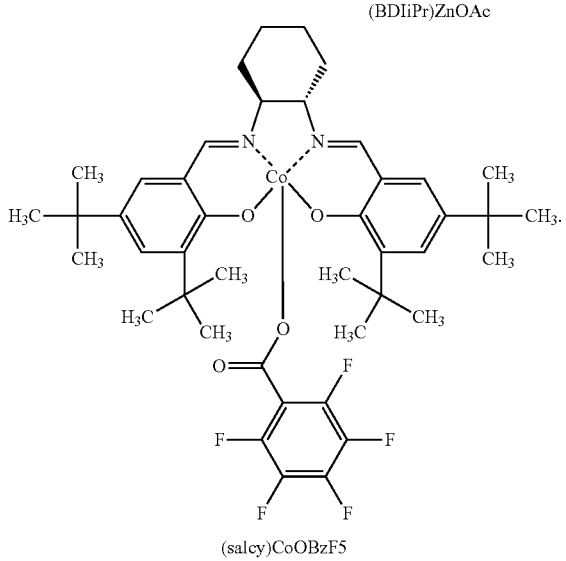

(salcy)CoOBzF5

20. The resin composition for laser engraving according to claim 1, wherein the resin composition further comprises (Component D) a catalyst for promoting a hydrolysis reaction and/or condensation reaction of Component A and (Component F) a polymerization initiator.

21. The resin composition for laser engraving according to claim 1, wherein Component C is a polymer having at least a monomer unit represented by Formulae (C-1) below:

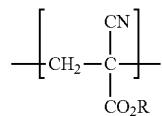
(C-1)

wherein R denotes an alkyl group having 1 to 20 carbons or an alkoxyalkyl group having 1 to 20 carbons.

22. The resin composition for laser engraving according to claim 1, wherein Component C is a polymer having at least a constituent unit represented by Formula (C-2) or Formula (C-3) below:

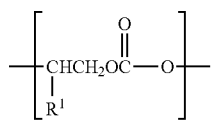
(C-2)

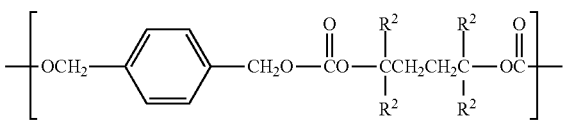
(C-3)

wherein $R^1$ denotes an alkyl group having 1 to 30 carbons, and the $R^2$s independently denote an alkyl group having 1 to 10 carbons.

23. The resin composition for laser engraving according to claim 1, wherein Component C is a polymer having at least a constituent unit represented by Formula (C-4) below:

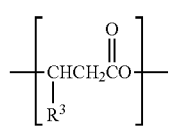
(C-4)

wherein $R^3$ denotes an alkyl group having 1 to 30 carbons.

* * * * *